(12) United States Patent
Park et al.

(10) Patent No.: US 8,798,158 B2
(45) Date of Patent: Aug. 5, 2014

(54) METHOD AND APPARATUS FOR BLOCK-BASED DEPTH MAP CODING AND 3D VIDEO CODING METHOD USING THE SAME

(75) Inventors: Gwang-Hoon Park, Seongnam-si (KR); Kyung-Yong Kim, Suwon-si (KR)

(73) Assignee: Industry Academic Cooperation Foundation of Kyung Hee University, Yongin-si (KR)

( * ) Notice: Subject to any disclaimer, the term of this patent is extended or adjusted under 35 U.S.C. 154(b) by 957 days.

(21) Appl. No.: 12/721,288

(22) Filed: Mar. 10, 2010

(65) Prior Publication Data

US 2010/0231688 A1 Sep. 16, 2010

(30) Foreign Application Priority Data

Mar. 11, 2009 (KR) .................. 10-2009-0020917
Sep. 17, 2009 (KR) .................. 10-2009-0088228

(51) Int. Cl.
| | |
|---|---|
| H04N 7/12 | (2006.01) |
| H04N 11/02 | (2006.01) |
| H04N 11/04 | (2006.01) |
| H04N 7/50 | (2006.01) |
| H04N 7/26 | (2006.01) |
| H04N 7/32 | (2006.01) |

(52) U.S. Cl.
CPC ............ *H04N 7/50* (2013.01); *H04N 7/26069* (2013.01); *H04N 7/26244* (2013.01); *H04N 7/26154* (2013.01); *H04N 7/26021* (2013.01); *H04N 19/00769* (2013.01); *H04N 7/26287* (2013.01)
USPC .................................................. 375/240.24

(58) Field of Classification Search
USPC .................................................. 375/240.24
See application file for complete search history.

(56) References Cited

U.S. PATENT DOCUMENTS

| | | | | |
|---|---|---|---|---|
| 5,442,458 A | * | 8/1995 | Rabbani et al. | ............... 382/247 |
| 5,617,334 A | * | 4/1997 | Tseng et al. | .................. 708/203 |

(Continued)

FOREIGN PATENT DOCUMENTS

| | | |
|---|---|---|
| KR | 10-2007-0029793 A | 3/2007 |
| KR | 10-2010-0004038 A | 1/2010 |
| KR | 10-2010-0083957 A | 7/2010 |
| KR | 10-2010-0083980 A | 7/2010 |

OTHER PUBLICATIONS

Fan Ling ; Weiping Li ; Hongqiao Sun; Bitplane coding of DCT coefficients for image and video compression. Proc. SPIE 3653, Visual Communications and Image Processing '99, 500 (Dec. 28, 1998); doi:10.1117/12.334699.*

*Primary Examiner* — Jeremaiah C Hallenbeck-Huber
(74) *Attorney, Agent, or Firm* — NSIP Law

(57) ABSTRACT

Provided are a block-based depth map coding method and apparatus and a 3D video coding method using the same. The depth map coding method decodes a received bitstream in units of blocks of a predetermined size using a bitplane decoding method to reconstruct a depth map. For example, the depth map coding method may decode the bitstream in units of blocks using the bitplane decoding method or an existing Discrete Cosine Transform (DCT)-based decoding method adaptively according to decoded coding mode information. The bitplane decoding method may include adaptively performing XOR operation in units of bitplane blocks. For example, a determination on whether or not to perform XOR operation may be done in units of bitplane blocks according to the decoded value of XOR operation information contained in the bitstream.

26 Claims, 21 Drawing Sheets

(56) References Cited

U.S. PATENT DOCUMENTS

| | | | |
|---|---|---|---|
| 2005/0013365 A1* | 1/2005 | Mukerjee et al. | 375/240.16 |
| 2005/0053300 A1* | 3/2005 | Mukerjee | 382/239 |
| 2005/0100229 A1* | 5/2005 | Becker et al. | 382/232 |
| 2006/0023963 A1* | 2/2006 | Boliek et al. | 382/240 |
| 2010/0165077 A1* | 7/2010 | Yin et al. | 348/42 |
| 2010/0215251 A1* | 8/2010 | Klein Gunnewiek et al. | 382/154 |
| 2010/0231689 A1* | 9/2010 | Bruls et al. | 348/43 |
| 2010/0310155 A1* | 12/2010 | Newton et al. | 382/154 |
| 2011/0002594 A1* | 1/2011 | Kim et al. | 386/248 |

* cited by examiner

FIG.1
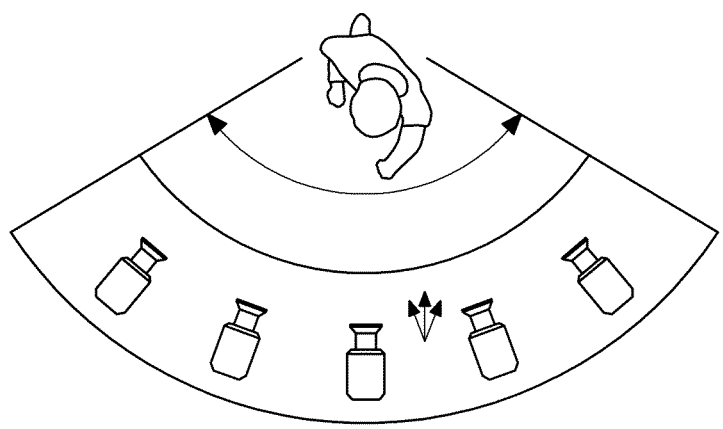
FIG.2
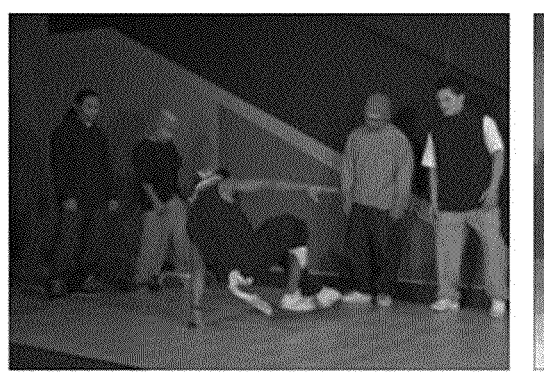 
(a)                                      (b)

FIG.3
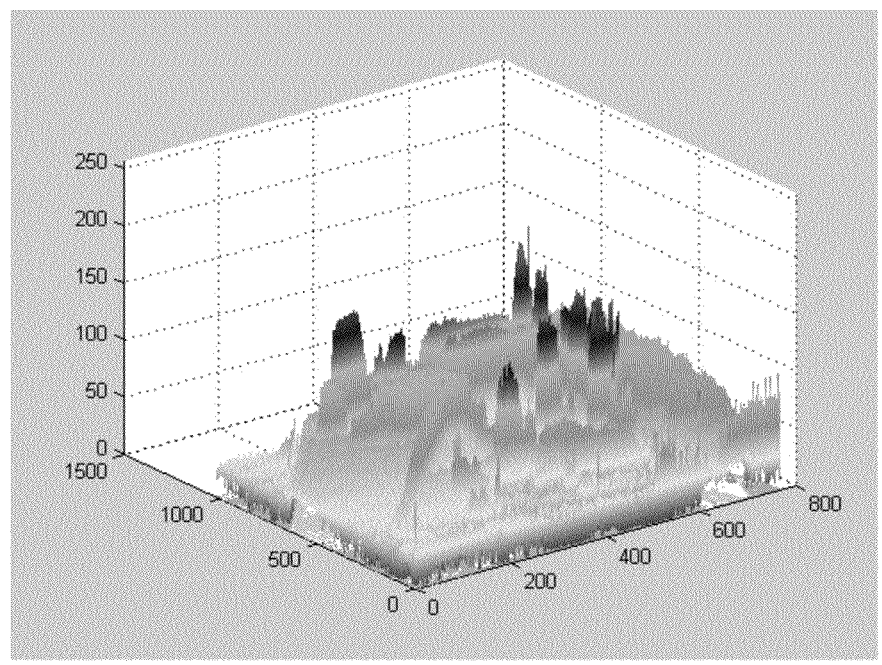
(a)
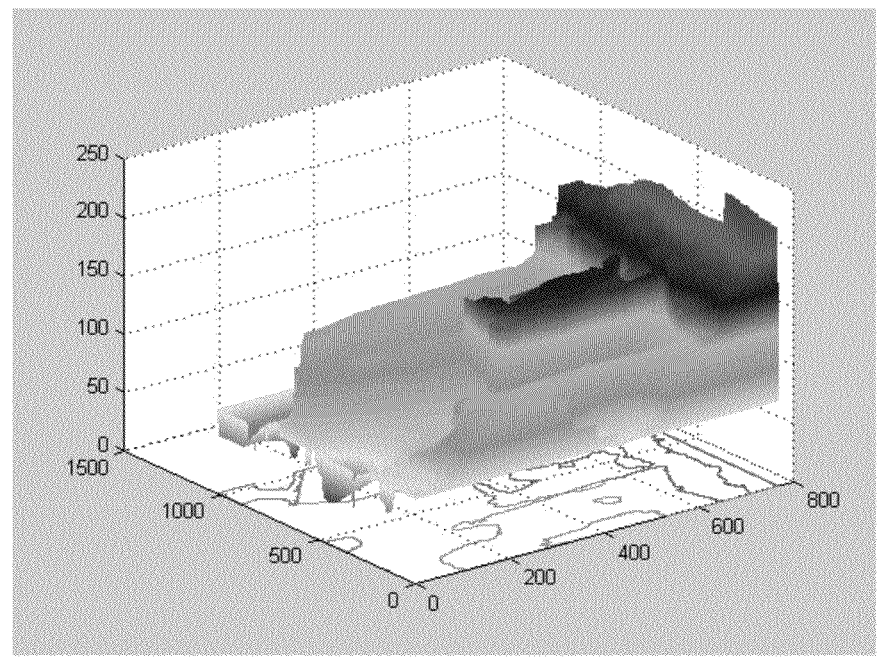
(b)

FIG.4
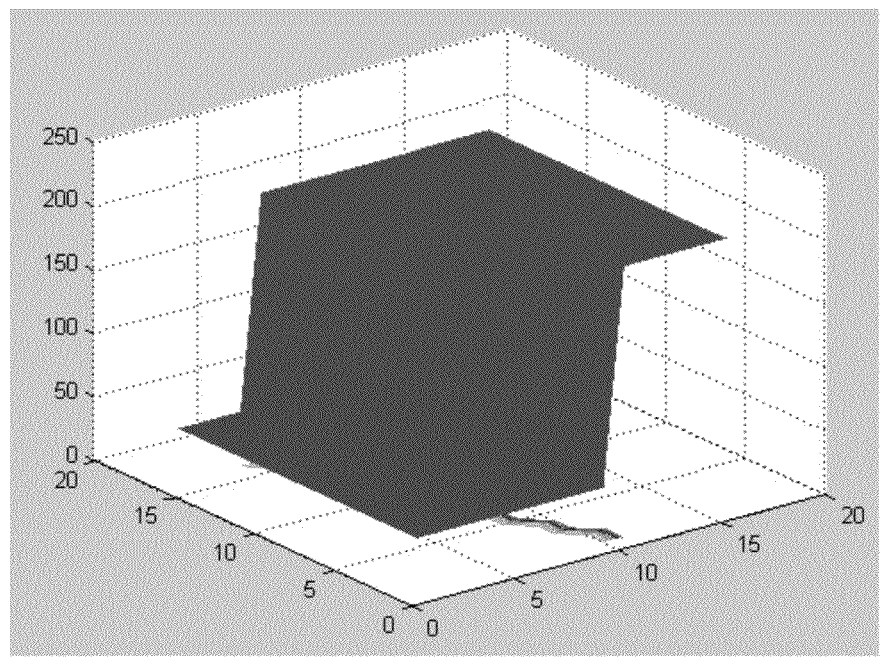
(a)
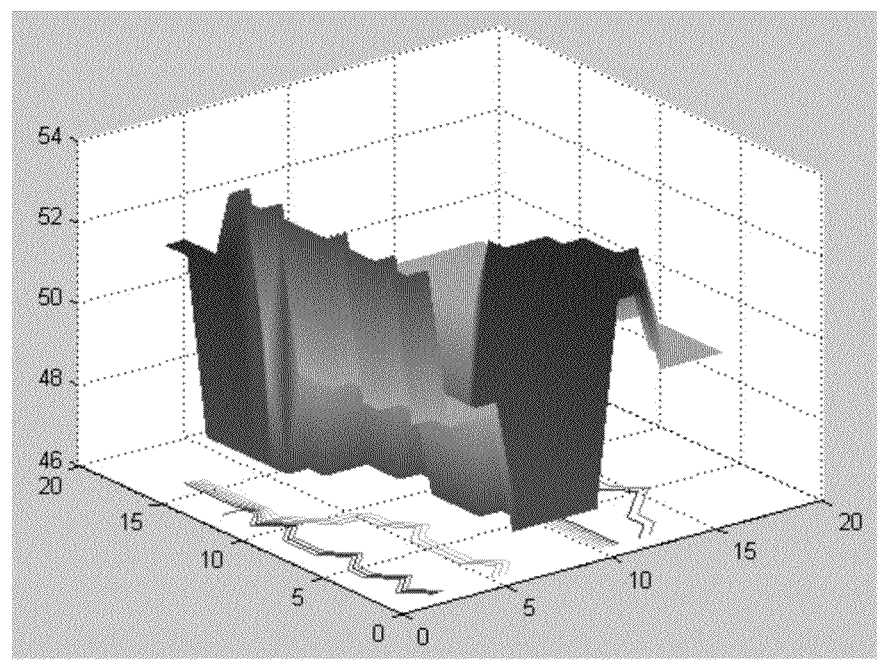
(b)

(a)          (b)

FIG.22
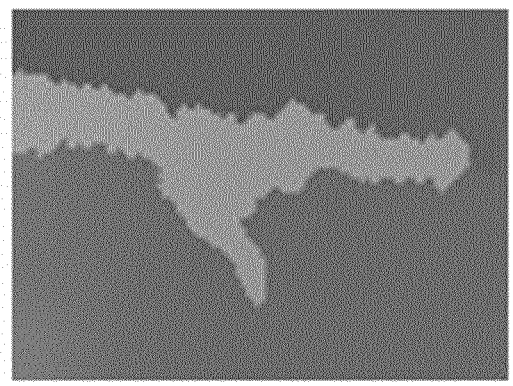
(a)
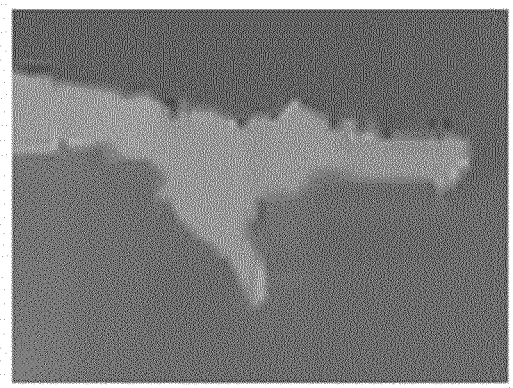
(b)
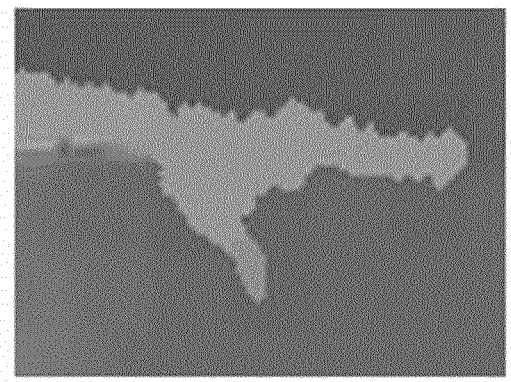
(c)

METHOD AND APPARATUS FOR BLOCK-BASED DEPTH MAP CODING AND 3D VIDEO CODING METHOD USING THE SAME

CROSS-REFERENCE TO RELATED APPLICATIONS

This application claims the benefit under 35 U.S.C. §119(a) of Korean Patent Application No. 10-2009-20917, filed on Mar. 11, 2009, and No. 10-2009-88228, filed on Sep. 17, 2009, the disclosure of each of which is hereby incorporated by reference in its entirety for all purposes.

BACKGROUND

1. Field

The following description relates generally to video coding, and more particularly, to a method and apparatus for encoding and decoding a depth map for images, and a 3D video coding method using the same.

2. Description of the Related Art

Due to increased interest in realistic media, research into the realistic media is being actively conducted. Realistic media allows users to see, hear and feel virtual environments realistically as if they are real worlds. Through realistic media, users can feel the same senses of reality and immersion as in the real world, in a virtual environment. Realistic media is expected to be applied to various fields including advertising, exhibition, education, medical treatment, etc., as well as broadcasting and communications fields.

An example of the realistic media is multi-view pictures. Multi-view pictures include images that are acquired from multiple view-points with respect to a scene. A user can observe an object at various angles through multi-view images of the object. Representative video coding for multi-view images includes Multi-view Video Coding (MVC) and 3D Video Coding.

MVC has been developed to efficiently encode/code multiple view images acquired from a plurality of cameras (for example, 4 or 8 cameras). MVC provides users with only the view-points of the cameras used for image capturing. Accordingly, in order for the MVC to provide multi-view images acquired from more view-points using encoded image data, use of more cameras having different view-points is inevitable. However, increasing the number of cameras increases the amount of image data required to be processed, and since existing delivery media (broadcasting media, communication media, storage media, etc.) have bandwidth-restrictions or storage capacity limitations, MVC can deliver only a limited number of view-points to users, without being able to provide any images with view-points that are different from view-points of the cameras.

3D video coding has been developed to overcome the drawback of MVC. 3D video coding supports creation of images with virtual view-points, as well as images with cameras' view-points. For the creation of images with virtual view-points, 3D video coding codes a depth map in addition to coding images with N view-points. Images with virtual view-points may be created by performing view-interpolation on images acquired from cameras having adjacent view-points and depth maps corresponding to the acquired images. 3D video coding supports a 3D display system such as Free View-Point Television (FTV).

FIG. 1 is a view for explaining an example of rendering through a FTV system to which 3D video coding is applied. In the FTV system illustrated in FIG. 1, 5 cameras are used. Upon coding, the FTV system encodes image information acquired from the 5 cameras and depth information of each image. Then, the FTV system decodes the encoded image information and depth information, and then uses the decoded image information and depth information for each camera's view-point to render an image with the camera's view-point and images with different view-points, that is, images with arbitrary view-points that are within a fan-shaped region (see FIG. 1).

In summary, 3D video coding, which can be applied to FTV systems, does not need all multi-view images to be acquired through cameras. Accordingly, while providing multi-view images with more view-points, 3D video coding is free from bandwidth-restrictions or storage capacity limitations, in comparison to MVC. Furthermore, 3D video coding makes it possible to provide images with a user's desired view-points without particular restrictions.

However, MVC encodes/decodes only image information of images with specific view-points, whereas 3D video coding has to encode/decode depth maps as well as image information. That is, 3D video coding further requires processes to create and encode/decode depth maps and to reconstruct images with virtual view-points using the depth maps. Most research that is currently in progress in association with 3D video coding is focused on creation of depth maps, rather than encoding/decoding of depth maps. The reason is because it has been considered that encoding/decoding of depth maps can be sufficiently covered by existing methods (hereinafter, referred to as image information coding methods) to code image information (brightness, chrominance, etc.).

A depth map is a map which represents distances from a camera to objects at a certain view-point. The distances from the camera to objects may depend on the locations of the objects, that is, the spatial locations of the objects in the corresponding image. The depth map may also be represented in units of pixels, like image information. For example, a depth map may be created by expressing the distances from a camera to objects with a predetermined amount of bits at the resolution of a current image.

However, since the real distances from a camera to objects may have great variations depending on frames, the distances from objects represented by individual pixels to the camera, that is, depth information may be expressed by relative values, not by absolute values. For example, after measuring the nearest point $Z_{near}$ and furthest point $Z_{far}$ from objects represented by individual pixels to the camera on the same frame, depth information is expressed by relative values that are defined within the nearest and furthest points $Z_{near}$ and $Z_{far}$. For example, if depth information is expressed by 8 bits, a pixel displaying an object at the nearest point $Z_{near}$ from the camera is set to have a value of "255", a pixel displaying an object at the furthest point $Z_{far}$ from the camera is set to have a value of "0", and pixels displaying objects at all other distances between the nearest and furthest points $Z_{near}$ and $Z_{far}$ are set to have predetermined values between "0" and "255" based on their distance to the camera.

In this manner, a depth map represents distance information based on the distances between real objects and the camera. Meanwhile, in existing video encoding/decoding, only image information, such as brightness or chrominance information, RGB values and so on, is subjected to encoding/decoding. Depth information and image information for a certain image may show similar characteristics in consideration of the fact that objects displayed on the image may be maintained constant in distance to a camera, in brightness, in color, etc., but there are many cases where depth information has little relevancy to image information. For example, objects (or different sides of an object) that are represented with different values of image information may be represented with the same or similar depth information. On the other hand, objects (or different sides of an object) that are represented with the same image information, such as brightness or chrominance, may be represented with different values of depth information.

However, since existing video coding methods have been developed with the aim of efficient compression in consideration of the characteristics of image information, they are not easily applied to efficiently encode depth maps in which the depth information has different characteristics to the image information. When reconstructing an image with a different view-point from a camera's view-point using a depth map, the accuracy of the depth map may have a direct influence on the quality of the finally reconstructed image. For these reasons, in order to maximize the advantage of 3D video coding against MVC, there is a need to develop a method of encoding/decoding depth maps efficiently in consideration of the unique characteristics of depth maps.

SUMMARY

The following description relates to a method and apparatus for efficiently encoding/decoding depth maps, and a 3D video coding method using the same.

The following description also relates to a depth map encoding/decoding method and apparatus capable of improving the picture quality of depth maps, and a 3D video coding method using the same.

The following description also relates to a method and apparatus for encoding/decoding depth maps in consideration of unique characteristics of depth maps, and a 3D video coding method using the depth map encoding/decoding method and apparatus.

The following description also relates to a depth map encoding/decoding method and apparatus capable of improving coding efficiency of depth maps in 3D video coding, thereby improving the picture quality of multi-view images to be interpolated.

In one general aspect, there is provided a method for decoding a depth map, the method including performing bitplane decoding on a bitstream in units of blocks of a predetermined size to reconstruct the depth map. For example, the method further includes decoding coding mode information for each depth map block, the coding mode information being contained in the bitstream, wherein the bitplane decoding is performed when the decoded coding mode information indicates bitplane decoding. Also, the bitplane decoding includes adaptively performing XOR operation in units of bitplane blocks. In more detail, the method further includes decoding XOR operation information contained in the bitstream, wherein the XOR operation is performed when the decoded XOR operation information indicates an XOR operation. In this case, the method further includes reconstructing the depth map by combining bitplane blocks subjected to XOR operation and/or bitplane blocks not subjected to XOR operation.

In another general aspect, there is provided a method for decoding a depth map, the method including performing XOR operation using a restored bitplane block and a reference bitplane block. For example, the performing of the XOR operation using the bitplane block and the reference bitplane block includes: decoding a bitstream in units of bitplane to restore a bitplane block; adaptively performing XOR operation on the restored plane block; and combining bitplane blocks subjected to XOR operation and/or bitplane blocks not subjected to XOR operation.

In another general aspect, there is provided a depth map decoding method including: decoding coding mode information for each depth map block, the coding mode information contained in a bitstream; and performing bitplane decoding or Discrete Cosine Transform (DCT)-based decoding on the bitstream in units of blocks according to the decoded coding mode information to restore bitplane blocks.

In another general aspect, there is provided a method for decoding a depth map block each pixel of which is represented by N bits, the method including: performing decoding according to block mode information for each bitplane block to restore n (≤N) bitplane blocks; adaptively performing XOR operation on each of the n bitplane blocks using a reference bitplane block according to XOR operation information for each of the bitplane blocks; and combining the n bitplane blocks subjected to and not subjected to the XOR operation.

In another general aspect, there is provided a depth map decoding method including: decoding block mode information included in a received bitstream; and restoring a current bitplane block using same-level block decoding or binary image decoding which is indicated by the block mode information.

Other objects, features and advantages will be apparent from the following description, the drawings, and the claims.

BRIEF DESCRIPTION OF THE DRAWINGS

FIG. 1 is a view for explaining an example of rendering through a Free View-Point Television (FTV) system to which 3D video coding is applied.

FIG. 2 shows a real image "Breakdancers" (a) that is one of Multi-view Video Coding (MVC) test sequences and a depth map image (b) corresponding to the real "Breakdancers" image (a).

FIG. 3 shows level distributions (a) regarding image information of the real "Breakdancers" image and level distributions (b) regarding depth information of the depth map image.

FIG. 4 shows a depth information graph (a) for a depth map block including the boundary of an object, and a depth information graph (b) for a depth map block corresponding to a background region.

FIG. 22 illustrates an original depth map image (a) corresponding to a part of the "Breakdancers" image, a depth map image (b) reconstructed by encoding and decoding the original depth map image using the existing H.264/AVC-based method, and a depth map image (c) reconstructed by encoding and decoding the original depth map image using the currently proposed coding method.

Elements, features, and structures are denoted by the same reference numerals throughout the drawings and the detailed description, and the size and proportions of some elements may be exaggerated in the drawings for clarity and convenience.

DETAILED DESCRIPTION

Figure 5:
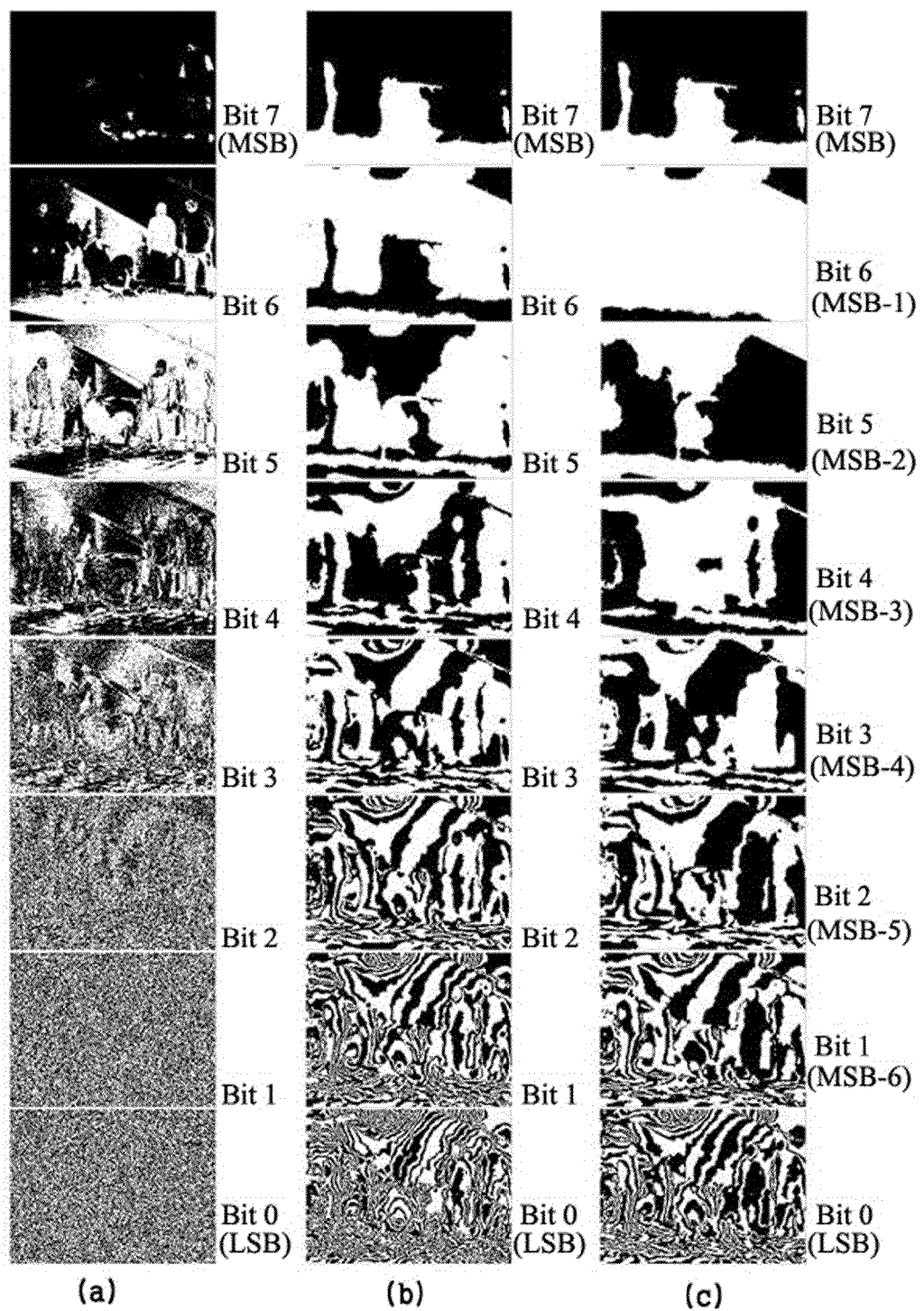
FIG. 5 shows images (a) obtained when the real image of FIG. 2 is represented in units of bitplanes, images (b) obtained when the depth map image of FIG. 2 is represented in units of bitplanes, and images (c) obtained when the depth map image of FIG. 2 is represented in units of bitplanes after gray coding.

The detailed description is provided to assist the reader in gaining a comprehensive understanding of the methods, apparatuses and/or systems described herein. Various changes, modifications, and equivalents of the systems, apparatuses, and/or methods described herein will likely suggest themselves to those of ordinary skill in the art. Also, descriptions of well-known functions and constructions are omitted to increase clarity and conciseness.

Prior to describing an encoding/decoding apparatus and method according to example embodiments, descriptions about unique characteristics of depth maps will be given below.

FIG. 2 shows examples of a real image and a depth map image corresponding to the real image, wherein (a) is a real image "Breakdancers" that is one of MVC test sequences, and (b) is a depth map image (b) corresponding to the real "Breakdancers" image (a). In the depth map image (b) of FIG. 2, depth information of each pixel is represented by 8 bits, and pixels representing objects located nearer to a camera have greater depth values.

A method of calculating a real distance from a camera to an object for each pixel using a depth map that is represented by 8 bits follows Equation 1.

$$z = z_{far} + v \cdot \frac{z_{near} - z_{far}}{255} \text{ with } v \in [0, \ldots, 255] \tag{1}$$

where v is a depth information value of a corresponding pixel, and $z_{far}$ and $z_{near}$ are parameters defined in the MPEG-C Part 3 and represent the furthest and nearest points from a camera to objects, respectively. Accordingly, an incremental step of depth information values which will be applied to a depth map may be obtained by dividing by $2^N$ a difference between the furthest and nearest distances in the real world displayed on the image, wherein N is the number of bits that are set to represent the depth map and in the current embodiment, N is set as 8.

FIG. 3 shows level distributions regarding image information and depth information with respect to the real "Breakdancers" image (a) illustrated in FIG. 2. (a) of FIG. 3 is a 3D graph showing image information (specifically, brightness levels) of individual pixels on the real "Breakdancers" image (a), and (b) of FIG. 3 is a 3D graph showing depth information (specifically, depth levels) of individual pixels on the depth map image (b) illustrated in FIG. 2. It can be seen from (a) and (b) of FIG. 2 that brightness variations are relatively sharp whereas variations in depth level are more gentle on the same image. However, normalizing the difference in characteristics between image information and depth levels has limitations, and furthermore may require very complicated processing for some image formats.

FIG. 4 is a view for explaining examples of unique characteristics of depth information, which are different from image information. (a) of FIG. 4 is a depth information graph in which a depth map block including the boundary of an object is expressed in three dimensions, and (b) of FIG. 4 is a depth information graph in which a depth map block corresponding to a background region is expressed in three dimensions. Referring to (a) of FIG. 4, in a block including the boundary of an object, pixels corresponding to the object boundary have sharp variations in depth information, but adjacent pixels belonging to an inner area of the object or to a background area of the object have the same or similar depth information values. Meanwhile, referring to (b) of FIG. 4, in a block including only the inner or background area of the object, depth information of individual pixels is within a range from 46 to 54, which is seen as if there are no great difference, but the depth information is seen to have more differences at some pixel locations.

The characteristics of depth information may reveal more definitely when a depth map image is represented in units of bitplanes. (a) of FIG. 5 shows images obtained when the real image of FIG. 2 is represented in units of bitplanes, and (b) of FIG. 5 shows images (b) obtained when the depth map image of FIG. 2 is represented in units of bitplanes. Referring to (a) and (b) of FIG. 5, bitplanes for bit 7 or Most Significant Bit (MSB) bit, bit 6 (MSB-1), bit 5 (MSB-2), bit 4 (MSB-3), bit 3 (MSB-4), bit 2 (MSB-5), bit 1 (MSB-6) and bit 0 or Least Significant Bit (LSB) are shown in this order. In the whole, bitplanes ((b) of FIG. 4) of a depth map image are very uniform relative to bitplanes ((a) of FIG. 4) of a real image, and this will be described in more detail, below.

Referring to (a) of FIG. 5, a bitplane for the MSB of a real image (image information) is very uniform, but the lower the bits are which are used to form bitplanes, the more complicated the bitplanes become. Particularly, bitplanes for the lower bits including the LSB are very complicated, almost like white noise. Referring to (b) of FIG. 5, the bitplanes of a depth map image are similar to the bitplanes of the real image in that the bitplanes become more complicated from the MSB toward LSB, but the bitplanes of the depth map image are more uniform than those of the real image. Also, the depth map image shows correlation in form between the bitplanes of some upper bits and the bitplanes of some lower bits, which is obviously seen in (c) of FIG. 5.

(c) of FIG. 5 is images obtained when the depth map image of FIG. 2 is represented in units of bitplanes after gray coding. Gray coding is transformation to code adjacent symbols by changing only one bit. Such transformation may be carried out by applying gray codes or performing eXclusive OR (XOR) operation. According to the gray coding, a transformed bitplane (or the gray-coded bitplane or the XOR-operated bitplane) for a current-level bit is represented by performing XOR operation on a bitplane for the current-level bit and a bitplane for a bit one level lower than the current-level or by performing XOR operation on the bitplane for the current-level bit and a bitplane for a bit one level higher than the current-level. Hereinafter, the latter case will be described as an example, but it will be understood by those skilled in the art that the former case can be applied in the same way.

In (c) of FIG. 5, likewise, gray-coded bitplanes for bit 7 or Most Significant Bit (MSB) bit, bit 6 (MSB-1), bit 5 (MSB-2), bit 4 (MSB-3), bit 3 (MSB-4), bit 2 (MSB-5), bit 1 (MSB-6) and bit 0 or Least Significant Bit (LSB) are shown in this order. Referring to (c) of FIG. 5, the gray coded bit planes of the depth map are more uniform than the original bitplanes (see (b) of FIG. 5).

Figure 6:
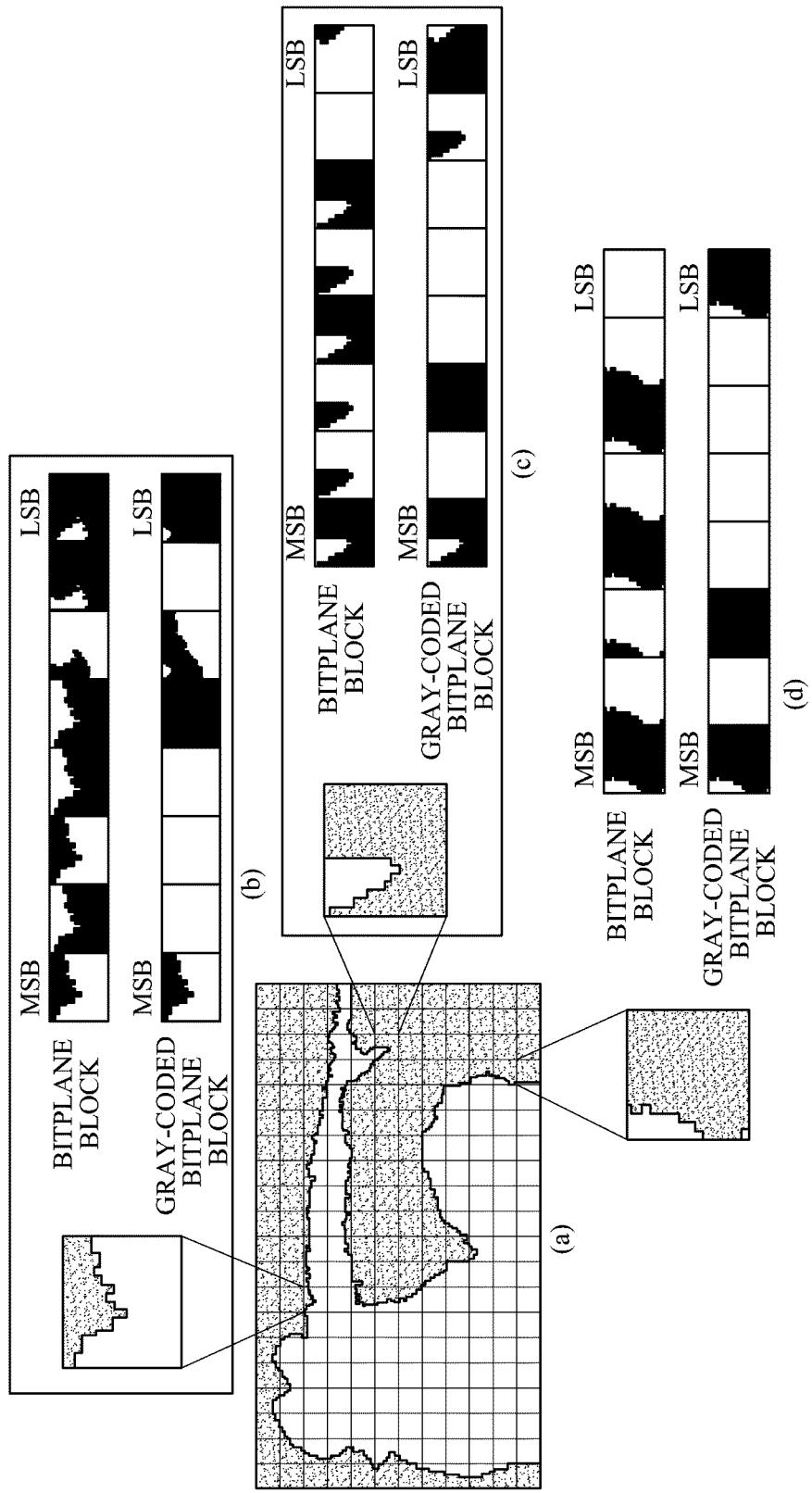
FIG. 6 illustrates a part of the depth map image of FIG. 2, blocks selected arbitrarily from the part, bitplane blocks of the selected blocks, and gray-coded bitplane blocks of the bitplane blocks.

These unique characteristics of a depth map will be understood in more detail by examining a depth map image in units of blocks. (a) of FIG. 6 is a part of the depth map illustrated in (b) of FIG. 2, and (b), (c) and (d) of FIG. 6 show blocks (for example, 16×16 blocks) selected arbitrarily from the depth map part, bitplanes for each selected block, and gray-coded bitplanes of the bitplanes. In this example, the selected blocks are blocks including the boundary of an object, but may be arbitrary blocks without any boundary areas.

It can be seen from (a), (b) and (c) of FIG. 6 that binary images of each bitplane match each other fully, partially or inversely. These characteristics of the depth map may not be shown in all blocks but in some blocks, and particularly, may be significant in blocks including the boundary of an object. This means that there is a high probability that some blocks of a depth map, particularly, depth map blocks including the boundaries of objects match each other fully, identically or inversely.

These characteristics of a depth map will be more obviously revealed by performing gray coding on the bitplane blocks. As seen in (b), (c) and (d) of FIG. 6, most blocks among gray-coded bitplane blocks (other bitplane blocks except the MSB plane block) have the same pixel value (0(0) or 255(1)). Due to the above-described characteristics of a depth map, if a binary image of a current bitplane block fully matches a binary image of the upper bitplane block, all pixels of the gray-coded bitplane block of the current bitplane block have a value "0(0)", and if a binary image of a current bitplane block inversely matches a binary image of the upper bitplane block, all pixels of the gray-coded bitplane block of the current bitplane block have a value of "255(1)".

However, if gray codes are applied to a depth map image, a binary image (a binary image of a gray-coded bitplane) of a bitplane for a specific bit is more uniform than that of the bitplane before gray coding, however, the binary image of the bitplane may have a more complicated form than the bitplane before gray coding. In other words, for some bits, the binary images of gray-coded bitplanes may have more complicated forms than the corresponding bitplanes before gray coding. This is because there are cases where bitplane binary images for some bit levels have little relevancy in form to bitplane binary images for the adjacent bit levels.

Figure 7:
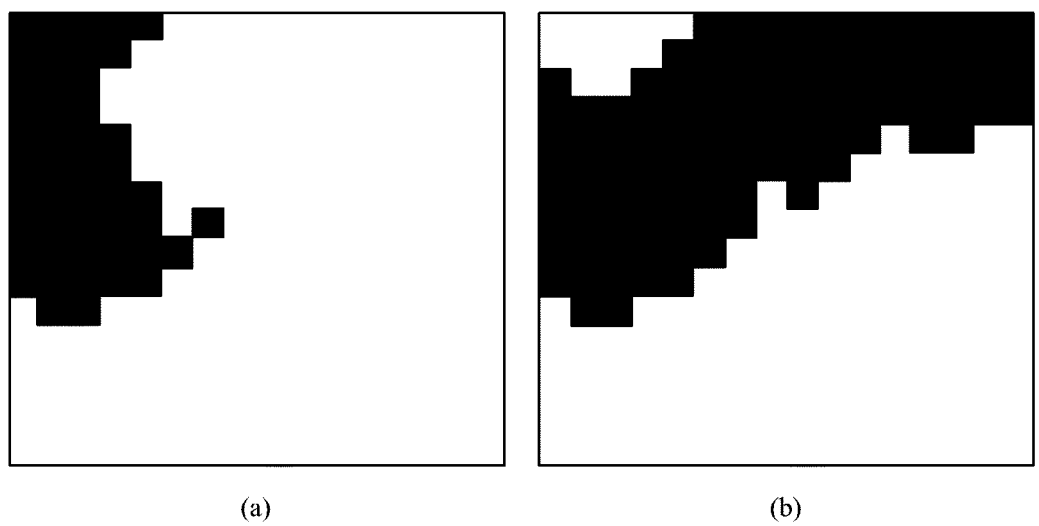
FIG. 7 shows an example bitplane block having little relevancy to bitplane blocks for adjacent levels of bits.

FIG. 7 shows an example bitplane block having little relevancy to bitplane blocks for adjacent levels of bits, wherein (a) of FIG. 7 is a binary image of a bitplane block for bit 2 (MSB-5) in (b) of FIG. 6, and (b) of FIG. 7 is a binary image of a gray-coded bitplane block for the bit 2 (MSB-5) in (b) of FIG. 6. It will be understood from (a) and (b) of FIG. 7 that applying gray codes to bitplanes for certain bits may make their binary images more complicated.

In summary, the unique characteristics of a depth map can be described as follows.

A depth map has very smooth variations between adjacent pixel values. When a depth map is represented in units of bitplanes and a binary image of each bitplane is compared to a binary image of a bitplane for its real image (image information), the binary image of each bitplane for the depth map is very uniform relative to the binary image of the bitplane for the image information.

When a depth map is divided into blocks and each block is represented in units of bitplanes, there are many cases where binary images of different levels of bitplane blocks for some blocks including the boundary of an object or being adjacent to the object boundary match each other fully or inversely. However, even in the case of blocks including the object boundary or being adjacent to the object boundary, such relevancy between the binary images of bitplane blocks does not appear over all levels of bits, and binary images of bitplane blocks for some levels of bits may become more complicated after gray-coding.

A depth map coding method according to an example embodiment includes the performing of encoding/decoding on a depth map based on the unique characteristics of a depth map, as follows.

First, a bitplane encoding method is selectively or adaptively applied. For example, some blocks of a depth map image (a frame or picture) are encoded by the bitplane encoding method, and the remaining blocks are encoded by an existing coding method to code image information. Hereinafter, the existing coding method is called "Discrete Cosine Transform (DCT)-based encoding method" in order only to distinguish it from the "bitplane encoding technique", and accordingly the term "DCT-based encoding method" used in this specification has to be understood not to be limited to encoding methods essentially including DCT but to include any other transform processes. In this case, each block may be encoded selectively by the DCT-based encoding method or by the bitplane encoding method by comparing coding efficiency upon application of the DCT-based encoding method to the block with that of the bitplane encoding method and applying one having better coding efficiency among the two coding methods to the block. This process will be described in more detail later. However, it is also possible to apply only the bitplane encoding method to depth map images.

In addition, some bitplanes of blocks that are to be encoded using the bitplane encoding method are encoded after adaptively being subjected to XOR operation (gray coding). In more detail, bitplanes for certain levels of bits are encoded without performing XOR operation thereon, but bitplanes for different levels of bits are encoded after performing XOR operation thereon. However, it will be understood by those skilled in the art that the bitplane encoding method adaptively using XOR operation does not exclude the cases where bitplanes for all levels of bits are subjected to XOR operation or not subjected to XOR operation.

Figure 8:
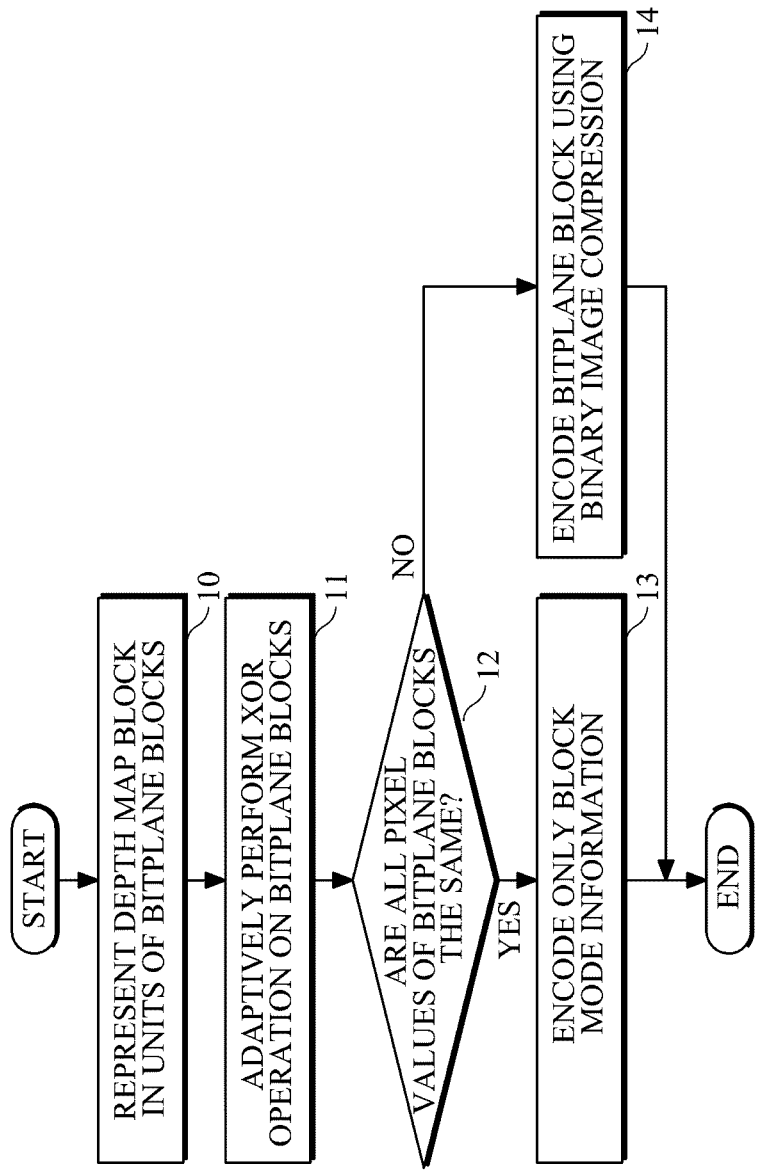
FIG. 8 is a flowchart illustrating an example method of encoding bitplanes of a depth map using adaptive application of XOR operation.

FIG. 8 is a flowchart illustrating an example method of encoding bitplanes of a depth map using adaptive application of XOR operation, wherein the method is to encode intra pictures.

Referring to FIG. 8, each received depth map blocks is represented in units of bitplane blocks to thus obtain a plurality of bitplane blocks (for example, 8 bitplane blocks) from MSB to LSB (operation 10).

Then, XOR operation is performed adaptively on each bitplane block (operation 11). In more detail, XOR operation is performed on only bitplane blocks for specific levels of bits. Levels of bits on which XOR operation will be performed are decided in consideration of coding efficiency. For example, only if the amount of bits that are generated when a bitplane block for a certain level of bit is coded without being subjected to XOR operation is more than the amount of bits that are generated when the bitplane block is coded after being subjected to XOR operation, then the bitplane block for the corresponding level of bit is determined to be required to be subjected to XOR operation. Information indicating whether to perform XOR operation may be represented, for example, by an XOR flag, and is included as additional information about the corresponding bitplane block for each level of bit in a bit-stream and then transmitted to a decoding terminal.

Performing XOR operation on a current bitplane and a reference bitplane means performing XOR operation on pixel values of the current bitplane and the corresponding pixel values of the reference bitplane. Here, the reference bitplane may be a bitplane for a bit level that is higher or lower by 1 level than that of the current bitplane. Alternatively, the reference bitplane may be a bitplane for a specific level of bit selected from among other bitplanes except the current bitplane or may be a bitplane obtained by performing XOR operation on the current bitplane and several specific bitplanes.

Thereafter, the bitplane coding method using adaptive application of XOR operation sequentially performs bitplane coding on bitplane blocks subjected to or not subjected to XOR operation. For example, the bitplane coding may be performed in the order from a MSB bitplane block to a LSB bitplane block. In this case, the bitplane coding does not need to be applied to all bitplane blocks. For example, in order to control the amount of bits that are generated, bitplane coding may be performed only on a predetermined number of upper bitplane blocks from a MSB bitplane block to a specific bitplane block, or bitplane coding may be performed after down-sampling. However, the current embodiment is not limited to these examples, and it is also possible that after operation 10, the following processes are applied only to a predetermined number of upper bitplane blocks to control the amount of bits that are generated by bitplane coding.

Upon bitplane coding for intra pictures, adaptive encoding may be performed depending on whether all pixel values in each bitplane block are the same. For this, it is determined whether all binary image values in the bitplane block are the same (operation 12). If all binary image values in the bitplane block are the same, for example, if all binary image values are "0(0)" or "255(1)", only block mode information (for example, an "all_0" mode or an "all_1" mode) indicating that all binary image values in the bitplane block are the same is encoded (operation 13). Meanwhile, if all binary image values in the bitplane block are not the same, the bitplane block may be encoded by a predetermined binary image compression method (operation 14), for example, by an Intra Context-based Arithmetic Encoding (intraCAE) method, which will be described later. In this case, a mode of the bitplane block may be set as an "intraCAE" mode.

Figure 9:
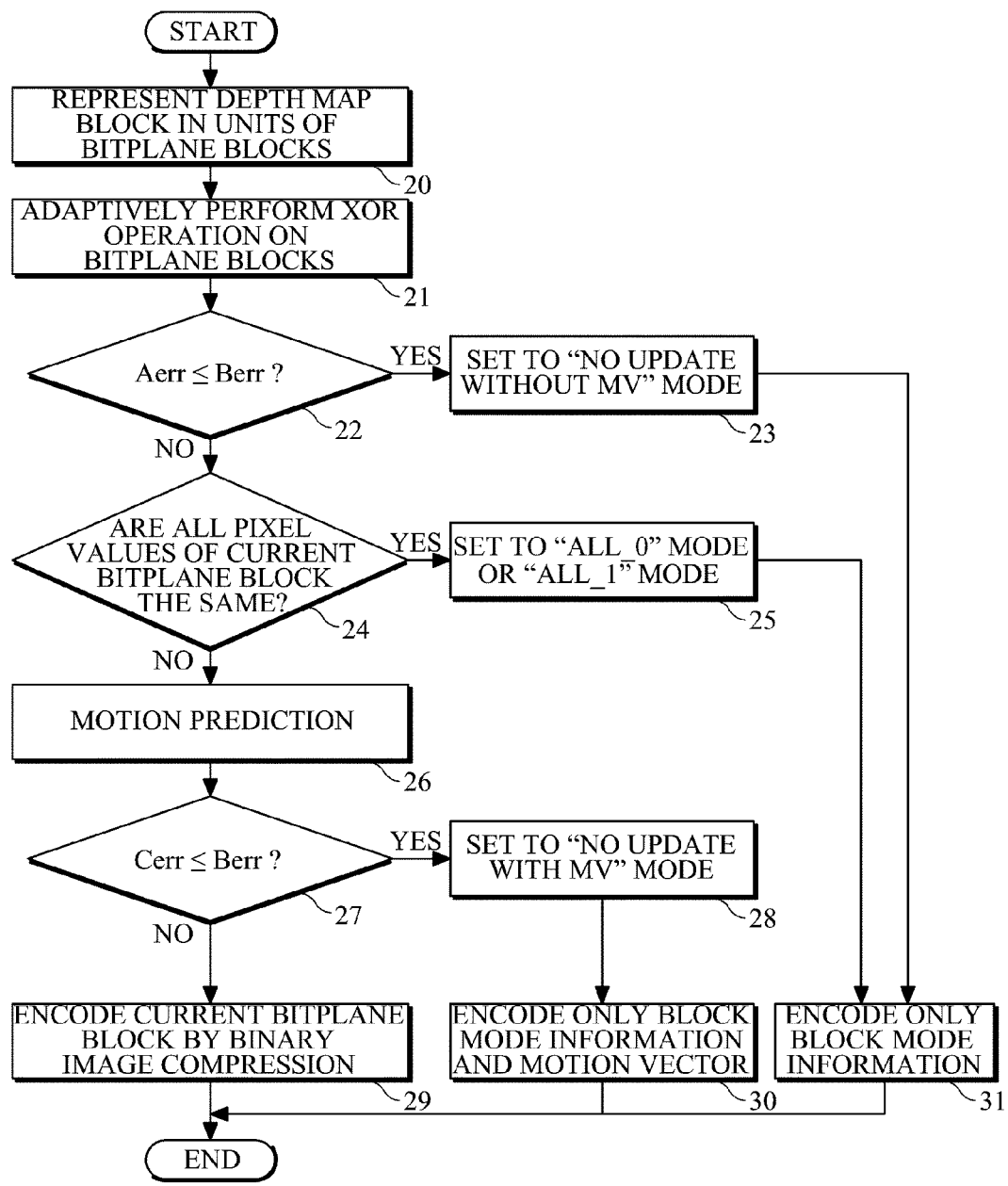
FIG. 9 is a flowchart illustrating another example method of encoding bitplanes of a depth map using adaptive application of XOR operation, suitable to encode inter-pictures.

FIG. 9 is a flowchart illustrating another example method of encoding bitplanes of a depth map using adaptive application of XOR operation, suitable to encode inter-pictures.

Referring to FIG. 9, like the operations 10 and 11 described above with reference to FIG. 8, each received depth map blocks is represented in units of bitplane blocks to thus obtain a plurality of bitplane blocks (for example, 8 bitplane blocks) from MSB to LSB (operation 20). Then, XOR operation is performed adaptively on all or a part of the bitplane blocks (operation 21). Levels of bits on which XOR operation will be performed are decided in consideration of coding efficiency. Then, information indicating whether to perform XOR operation may be represented, for example, by an XOR flag, and is included as additional information about a bitplane block for each level of bits in a bit-stream and then transmitted to a decoding terminal.

Thereafter, bitplane coding is sequentially performed on bitplane blocks subjected to or not subjected to XOR operation. For example, the bitplane coding may be performed in the order from a MSB bitplane block to a LSB bitplane block. In this case, the bitplane coding does not need to be applied to all the bitplane blocks. For example, in order to control the amount of bits that are generated, bitplane coding may be performed only on a predetermined number of upper bitplane blocks from a MSB bitplane block to a specific bitplane block, or bitplane coding may be performed after down-sampling.

Bitplane coding for inter-pictures may be performed efficiently using the following method. However, processes from operation 22 to operation 30 are examples and the current embodiment is not limited to these processes. For example, operation 22 of deciding a mode using a predicted value MVp of a motion vector may be omitted so that operation 24 is performed just after operation 21.

First, an error Aerr between a current bitplane block and a reference bitplane block, corresponding to a predicted value MVp of a motion vector MV of the current bitplane block, is calculated, and then it is determined whether the error Aerr is within a predetermined allowable error (Berr) range (operation S22). A method of calculating the predicted value MVp of the motion vector MV of the current bitplane block is not limited and the allowable error Berr may also be arbitrarily set. If it is determined that the error Arr is equal to or less than the allowable error Berr, a predetermined block mode (for example a "No Update Without MV" mode) indicating the result of the determination is set for the bitplane block (operation 23), and only the predetermined block mode information (that is, a predetermined value indicating the "No Update Without MV" mode) is encoded (operation 31).

Meanwhile, if it is determined in operation 23 that the error Aerr is greater than the allowable error Berr, adaptive encoding may be performed depending on whether all binary image values in the current bitplane block are the same. For the adaptive encoding, it is determined whether all binary image values in the bitplane block are the same (operation 24). If it is determined that all binary image values in the bitplane block are the same, for example, if all the binary image values are "0(0)" or "255(1)", a predetermined block mode (for example, an "all-0" mode or an "all-0" mode) indicating the result of the determination is set for the bitplane block (operation 25) and only the predetermined block mode information (that is, a predetermined value indicating the "all_0" mode or the "all_1" mode) is encoded (operation 31).

Meanwhile, if it is determined that all the binary image values in the bitplane block are not the same, motion prediction is performed on the current bitplane block to calculate a motion vector of the current bitplane block (operation 26). Then, an error Cerr between the current bitplane block and the reference bitplane block, corresponding to the motion vector MV, is calculated and it is determined whether the error Cerr is within a predetermined allowable error (Berr) range (operation 27). At this time, the Berr value is the same as that used in operation 22 or may be newly set as an appropriate value. If it is determined that the error Cerr is equal to or less than the allowable error Berr, a predetermined block mode (for example, a "No Update With MV" mode) indicating the result of the determination is set for the corresponding bitplane block (operation 28), and only the block mode information (a predetermined value indicating the "No Update With MV" mode) and the motion vector MV are encoded (operation 30).

Meanwhile, if the error Cerr is greater than the allowable error Berr, the error Cerr for the current bitplane block may be encoded by a predetermined binary image compression method, for example, by a CAE method (operation 29). At this time, the encoding may be adaptively performed by using any one of an intraCAE method and an interCAE method or by using a CAE method having higher coding efficiency between the intraCAE and the interCAE methods. In the case of performing the encoding using a CAE method having higher coding efficiency, the amount of bits that are generated when the bitplane block is encoded using the intraCAE method is compared with the amount of bits that are generated when the bitplane block is encoded using the interCAE method, so that the bitplane block is encoded using a CAE method through which a lower amount of bits are generated. Also, a block mode for the current bitplane block may be set as an intraCAE mode or an interCAE mode.

Hereinafter, an example apparatus of encoding a depth map using the unique characteristics of a depth map, and an encoding method thereof will be described.

Figure 10:
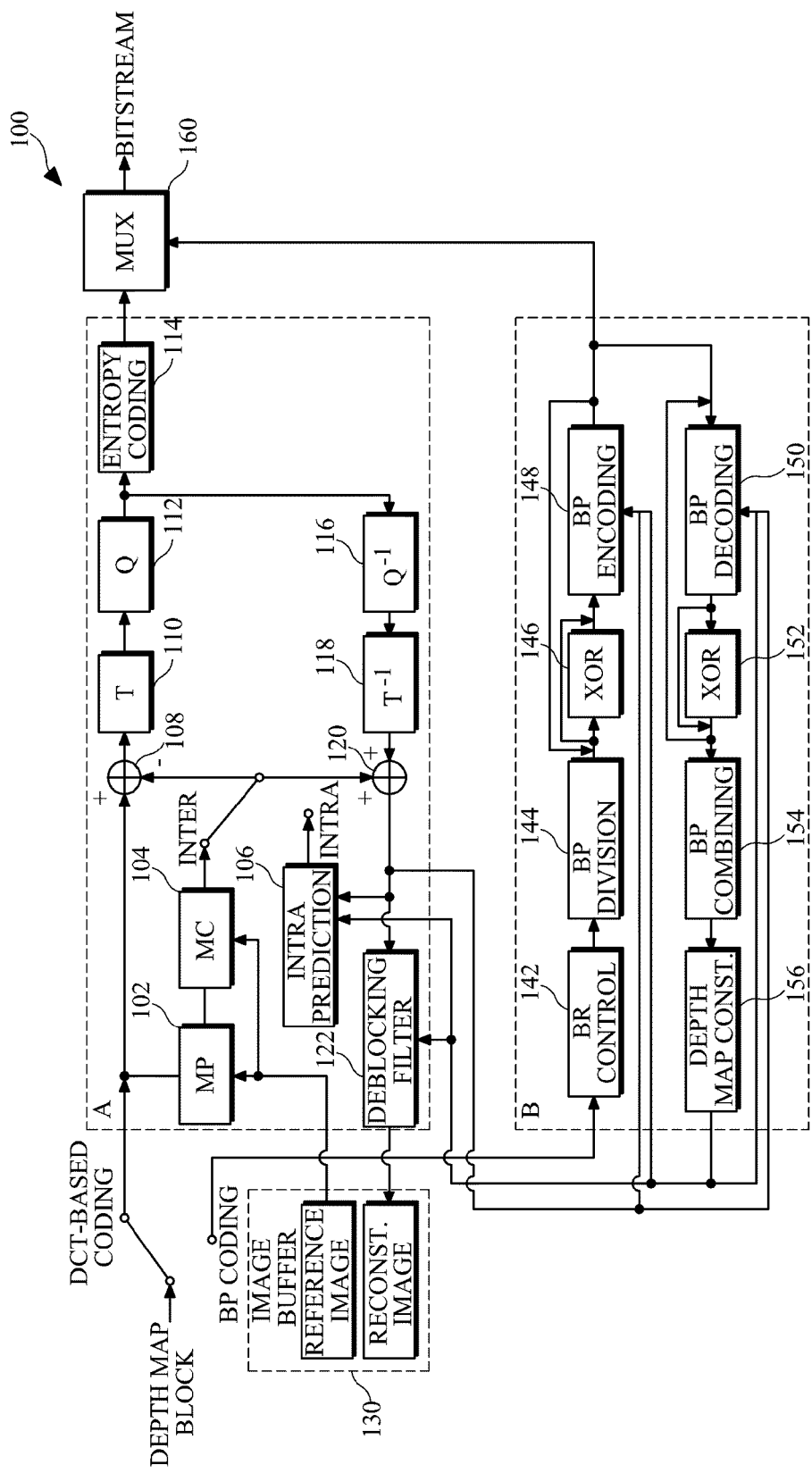
FIG. 10 is a diagram illustrating a configuration of an example depth map encoder.

FIG. 10 is a diagram illustrating a configuration of an example depth map encoder. The depth map encoder includes a DCT-based encoding unit and a bitplane encoding unit and encodes a received depth map in units of blocks of a predetermined size (M×N). Here, M×N is not limited to a specific value, and the received depth map may be encoded in units of a macro block such as a 16×16 block, in units of a block having a size larger than the macro block, or in units of a smaller size of block such as an 8×8 or 4×4 block.

Referring to FIG. 10, the depth map encoder 100 includes a DCT-based encoding unit A and a bitplane encoding unit B. The DCT-based encoding unit A is provided to encode a depth map in units of blocks using the same encoding method as that used to encode image information. As illustrated in FIG. 10, the DCT-based encoding unit A may be based on H.264/AVC (Advanced Video Coding), but is not limited to this. For example, the DCT-based encoding unit A may be based on the MPEG-1, MPEG-2, MPEG-4 Part 2 Visual, VC (Video Coding)-1, MVC, SVC (Scalable Video Coding), any other existing coding scheme, or a new coding scheme that will be developed in the future.

Meanwhile, the bitplane encoding unit B is provided to represent the depth map block in units of bitplane blocks, to adaptively apply XOR operation on each bitplane block and then to perform encoding on each bitplane block. The current embodiment is not limited to the configuration of the bitplane encoding unit B. For example, some components (for example, a bit rate controller 142) of the bitplane encoding unit B may be arbitrarily replaced by different devices, integrated into one body or divided into smaller functional units. Details for the bitplane encoding unit B and an encoding method thereof will be provided later.

According to the current embodiment, the depth map encoder 100 encodes data using an encoding unit having higher coding efficiency between the DCT-based encoding unit A and the bitplane encoding unit B, and then outputs the encoded data in the form of a bitstream. The bitstream contains encoded depth map data and information (hereinafter, coding mode information represented, for example, by bitplane_coding_flag) indicating which encoding unit has encoded the depth map data. In other words, the coding mode information is information indicating that the encoded depth map data has been encoded in a DCT-based coding mode or in a bitplane coding mode. The coding mode information may be represented in an appropriate form. For example, the DCT-based coding mode may be indicated by coding mode information (for example a single bit of "0") and the bitplane coding mode may be indicated by coding mode information (for example a single bit of "1"), or vice versa.

Figure 11:
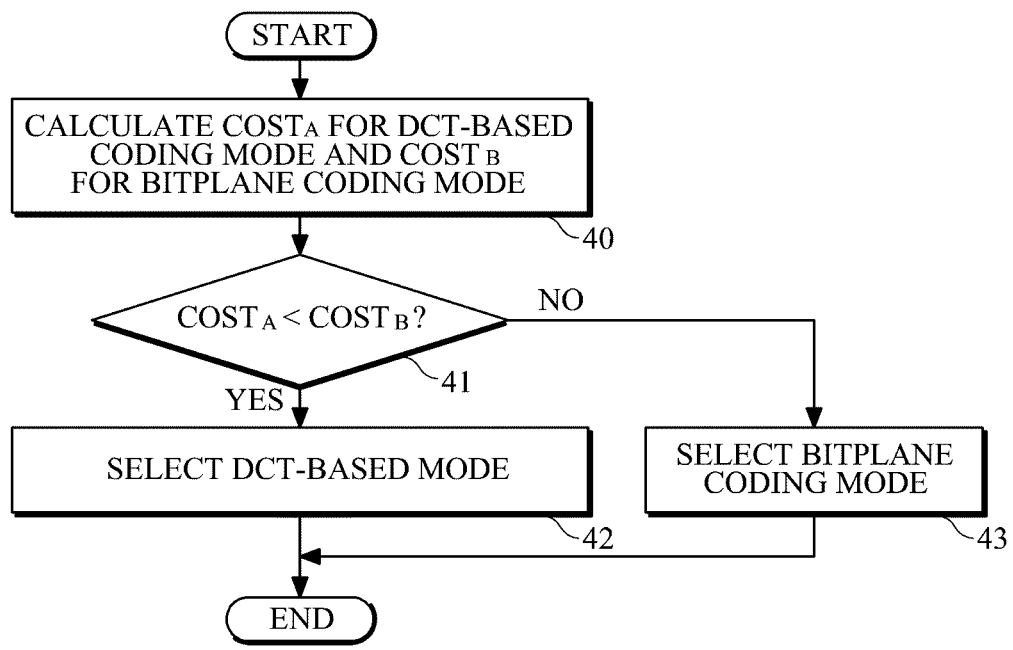
FIG. 11 is a flowchart illustrating an example method in which the depth map encoder illustrated in FIG. 10 selects a mode having higher coding efficiency from among a DCT-based coding mode and a bitplane coding mode.

Accordingly, the depth map encoder 100 includes a mode selection unit, such as an electrical circuit or a software program, to select such a coding mode. FIG. 11 is a flowchart illustrating an example method in which the depth map encoder 100 illustrated in FIG. 10 selects a mode having higher coding efficiency from the DCT-based coding mode (encoding performed by the DCT-based encoding unit A) and the bitplane coding mode (encoding performed by the bitplane encoding unit B).

Referring to FIG. 11, the depth map encoder 100 calculates $Cost_A$ that is to be generated when a received M×N block is encoded in the DCT-based coding mode, and $Cost_B$ that is to be generated when the M×N block is encoded in the bitplane coding mode (operation 40). The $Cost_A$ and $Cost_B$ may be calculated by an appropriate method. For example, the $Cost_A$ and $Cost_B$ may be calculated by a Rate-Distortion (RD) optimization technique defined in H.264/AVC. The RD optimization technique may be expressed by Equation 2 below.

$$Cost_i = SSD_i + \lambda_{MODE} \cdot R_i, \lambda_{MODE} = 0.85 \cdot 2^{(QP-12)/3}, \quad (2)$$

where $SSD_i$ (Sum of Squared Differences) represents a sum of squared differences between an original image and its reconstructed image, $\lambda_{MODE}$, which is a value created using a quantization parameter QP and represents a Lagrange constant for a macro block and $R_i$ represents an amount of bits that are generated upon actually coding in a corresponding macro block mode.

Then, the $Cost_A$ for the DCT-based coding mode is compared with the $Cost_B$ for the bitplane coding mode (operation 41). If the $Cost_A$ is less than the $Cost_B$, the DCT-based mode is selected (operation 42), and if the $Cost_B$ is less than the $Cost_A$, the bitplane coding mode is selected (operation 43). Accordingly, if the $Cost_A$ for the DCT-based coding mode is less than the $Cost_B$ for the bitplane coding mode, a coding mode bit of a received M×N block (or a predetermined size of block that is an encoding unit) indicates the DCT-based coding mode, and if the $Cost_B$ is less than the $Cost_A$, a coding mode bit of the M×N block indicates the bitplane coding mode. As described above, the coding mode bit is included in a bitstream along with depth map data encoded in the corresponding mode.

Returning to FIG. 10, the depth map encoder 100 includes an encoding unit based on H.264/AVC as an example of the DCT-based encoding unit A. In the following descriptions, the case where the DCT-based encoding unit A is an H.264/

AVC-based encoding unit is given as an example, but the DCT-based encoding unit A may be based on any other video codec.

Data which is input to the DCT-based encoding unit A is a depth map (for example, in the image format of 4:0:0), and a depth map may be input, in units of a M×N block, for example, in units of a 16×16 macro block. Then, the DCT-based encoding unit A performs encoding in an intra mode or in an inter mode. When the DCT-based encoding unit A performs encoding in the intra mode, an internal switch of the DCT-based encoding unit A is switched to "intra", and when the DCT-based encoding unit A performs encoding in an inter mode, the internal switch is switched to "inter". The DCT-based encoding unit A based on H.264/AVC generates predicted blocks for received macro blocks. Then, the DCT-based encoding unit A calculates differences between the predicted blocks and the received macro blocks and then encodes residual data composed of the differences. This process will be described in further detail below.

A method of generating predicted blocks of received blocks depends on whether encoding is determined to be performed in the intra mode or in the inter mode. When encoding is determined to be performed in the intra mode, an intra predictor 106 performs spatial prediction on a currently received macro block using already coded pixel values of peripheral pixels, thereby generating a predicted block of the current macro block. Meanwhile, when encoding is determined to be performed in the intra mode, a motion predictor 102 performs motion prediction to search for a region most matching a currently received block from among reference images stored in a reference image buffer of an image buffer 130, thus calculating a motion vector. Then, a motion compensator 104 performs motion compensation to fetch a predicted block from the corresponding reference image stored in the reference image buffer using the motion vector, thereby generating the predicted block.

Then, a first adder 108 calculates a difference between the predicted block and the current block, thus generating a residual block. A transformer 110 performs transformation on the residual block, thereby outputting a transform coefficient. The transform coefficient is input to a quantization unit 112, and the quantization unit 112 performs quantization on the quantization coefficient according to a quantization parameter QP, thus outputting a quantization coefficient. The quantization coefficient is transferred to an entropy coder 114 and subjected to entropy coding based on probability distributions by the entropy coder 114.

The encoded data output from the entropy coder 114 after entropy coding is transferred to a multiplexer 160, and the multiplexer 160 outputs the encoded data in the form of a bitstream along with additional information/data.

Meanwhile, the DCT-based encoding unit A based on H.264/AVC decodes the encoded current image and then stores the result of the decoding in the image buffer 130. This is because the current image will be used as a reference image upon encoding subsequently received images. For the decoding, a dequantization unit 116 dequantizes the quantization coefficient to generate a dequantization coefficient, and performs inverse-transformation on the dequantization coefficient, thus generating a residual block. The residual block is added to the predicted block in a second adder 120, and as a result, a reconstructed block is output. The reconstructed block output from the second adder 120 may be used for inter prediction by the intra predictor 106 or as a reference block for use in the bitplane encoding unit B. Also, the reconstructed block is input to a deblocking filter 122 and subjected to removal of a blocking artifact produced upon encoding, and then stored in a reconstructed image buffer of the image buffer 130.

Referring to FIG. 10, the depth map encoder 100 includes the bitplane encoding unit B to perform encoding in units of bitplanes while adaptively applying XOR operation. Data which is input to the DCT-based encoding unit A is a depth map (for example, in the image format of 4:0:0), and a depth map may be input, in units of M×N blocks, for example, in units of 16×16 macro blocks. The bitplane encoding unit B represents a received depth map in units of bitplane blocks through a bitplane divider 144 and then encodes the bitplane blocks according to the bitplane encoding method using adaptive application of XOR operation as described above with reference to FIG. 8 or 9. At this time, bit rate adjustment may be additionally performed. Hereinafter, processing of the bitplane encoding unit B will be described.

First, the bitplane encoding unit B may process data in various units. For example, the bitplane encoding unit B may divide a received M×N block into a plurality of subblocks and perform adaptive encoding on each subblock. Alternatively, the bitplane encoding unit B combines a predetermined number of received M×N blocks into a larger block and performs encoding on the combined block, or performs encoding after again dividing the combined block into a plurality of subblocks.

The bit rate controller 142 is used to adjust the amount of encoded data (that is, a bit rate) which is output from the bitplane encoding unit B. The bit rate controller 142 is an arbitrary component capable of operating only when the output amount of encoded data is necessary to be adjusted. Alternatively, instead of the bit rate controller 142 adjusting the bit rate, the bit rate may be adjusted by appropriately modifying an encoding algorithm which is used by the bitplane encoding unit 148 or by applying downsampling, etc. upon encoding by the bitplane encoding unit 148.

The bit rate controller 142 may adjust the bit rate using an arbitrary method. For example, when a depth map is represented using N bits of depth values, the bit rate controller 142 may adjust a bit rate by assigning only a predetermined amount of bits (for example, a predetermined number n ($\leq$N) of upper bits) to each bitplane block that is to be encoded. For the bit rate adjustment, the bit rate controller 142 may delete the (N−n) lower bits from a received depth map block which is represented by N bits and output a depth map block which is represented by the n upper bits.

In this case, the amount of bits that are to be assigned to each bitplane block to be encoded may be decided arbitrarily or decided based on information affecting a bit rate, for example, based on a quantization parameter QP of the DCT-based encoding unit A. In addition, the bit rate controller 142 may generate restored information about the deleted (N−n) lower bits, for example, information indicating whether to restore all the lower (N−n) bits to "0(0)" or to "255(1)" upon decoding or information about a padding method for restoring all the lower (N−n) bits, and output the restored information to the multiplexer 160.

Figure 12:
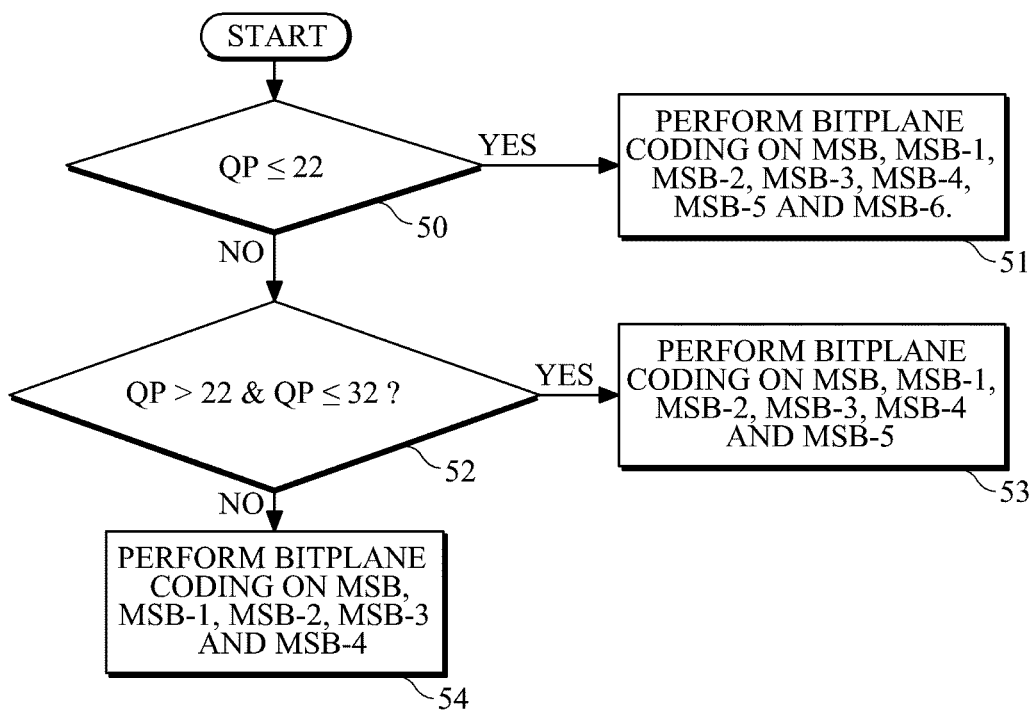
FIG. 12 is a flowchart illustrating an example method in which a bit rate controller of the depth map encoder illustrated in FIG. 10 decides a bit rate.

FIG. 12 is a flowchart illustrating an example method in which the bit rate controller 142 decides a bit rate based on a quantization parameter QP. The quantization parameter QP used to decide a number of bitplanes that are to be coded may be defined in H.264/AVC. However, the current embodiment is not limited to this.

Referring to FIGS. 10 and 12, first, it is determined whether the quantization parameter QP is equal to or less than a predetermined value, for example, 22 (operation 50). If the quantization parameter QP is less than or equal 22, the bitplane coding unit B codes all or some (for example, 7 upper bitplanes MSB, MSB-1, MSB-2, MSB-3, MSB-4, MSB-5 and MSB-6) of bitplane blocks (operation 51). If the quantization parameter QP is greater than 22, it is determined whether the quantization parameter QP is less than or equal to 32 (operation 52). If it is determined that the quantization parameter QP is greater than 23 and less than or equal to 32, the bitplane coding unit B codes only selected parts (for example, 6 upper bitplanes MSB, MSB-1, MSB-2, MSB-3, MSB-4 and MSB-5) of each bitplane block, thus requiring less coding than the amount that would have been coded in operation 51 (operation 53). Meanwhile, if the quantization parameter QP is greater than 32, the bitplane coding unit B codes a further smaller selection of parts (for example, 5 upper bitplanes MSB, MSB-1, MSB-2, MSB-3 and MSB-4) of each bitplane block than was to be coded in operation 53 (operation 54).

The bitplane divider 144 receives n bits of a depth map block and represents the depth map block into n bitplane blocks. Then, the bitplane divider 144 outputs the n bitplane blocks to an XOR operator 146 and/or a bitplane encoding unit 148. In FIG. 10, the bitplane divider 144 is drawn, for convenience of description, to be separated from the bit rate controller 142, however, the bit rate controller 142 and the bitplane divider 144 may be integrated into a single unit. Alternatively, it is also possible that the bitplane divider 144 divides a received depth map block into N bitplane blocks and then the bit rate controller 142 causes only n bitplane blocks of the N bitplane blocks to be output to the XOR operation 146 and/or the bitplane encoding unit 148.

The XOR operator 146 performs XOR operation on all or some of the n bitplane blocks output from the bitplane divider 144. For example, as described above with reference to FIG. 8 or 9, a determination on which bitplane blocks among the n bitplane blocks XOR operation has to be performed may be done by comparing the amount of bits that are generated when each bitplane block is coded without being subjected to XOR operation with the amount of bits that are generated when the bitplane block is coded after being subjected to XOR operation. However, the current embodiment is not limited to this. Also, the XOR operator 146 generates predetermined information (for example, an "XOR flag") indicating that XOR operation has been performed on the corresponding bitplane block and then transfers the information to the multiplexer 160. The information is included in a bitstream and transferred to the decoding terminal.

Figure 13:
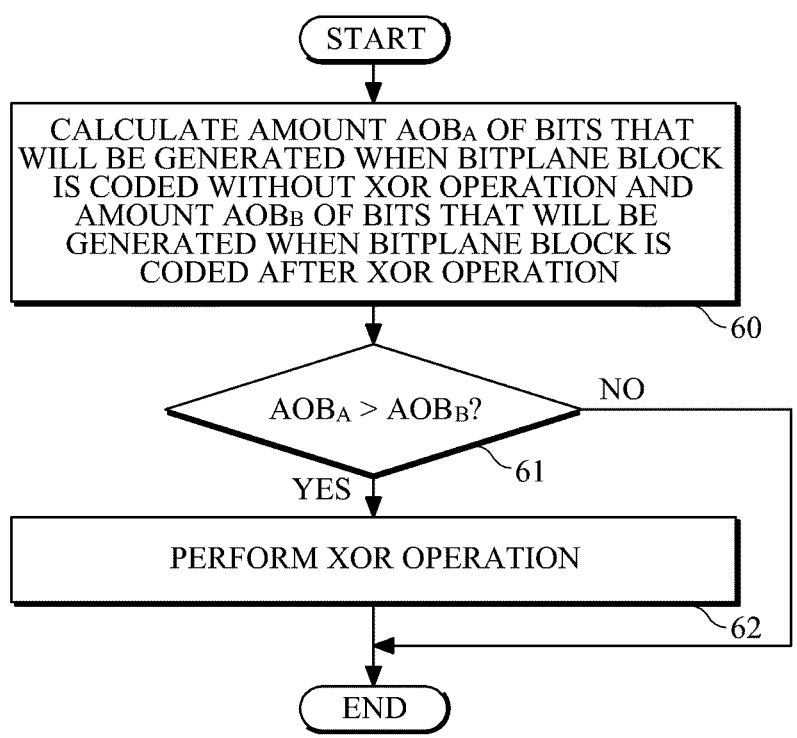
FIG. 13 is a flowchart illustrating an example method of determining whether or not to perform XOR operation.

FIG. 13 is a flowchart illustrating an example method of determining whether or not to perform XOR operation. Referring to FIGS. 10 and 13, first, the amount $AOB_A$ of bits that are generated when a currently received bitplane block is coded without being subjected to XOR operation and the amount $AOB_B$ of bits that are generated when the bitplane block is coded after being subjected to XOR operation with a reference bitplane are calculated (operation 60). Then, the bits amount $AOB_A$ is compared with the bits amount $AOB_B$ (operation 61). When it is determined that the bits amount $AOB_A$ is greater than the bits amount $AOB_B$, the bitplane block is subjected to XOR operation (operation 62). If the bits amount $AOB_B$ is greater than the bits amount $AOB_A$, the bitplane block is input to the bitplane encoding unit 148 without being subjected to XOR operation. If the bits amount $AOB_A$ is equal to the bits amount $AOB_B$, a determination on whether to perform XOR operation is arbitrarily done.

When the XOR operator 146 performs XOR operation, a reference bitplane may be set as a bitplane block for a bit level that is 1 level higher than the bit level of the current bitplane block, or set as a bitplane block for a bit level that is 1 level lower than the bit level of the current bitplane block. For example, when a reference bitplane may be set as a bitplane block for a bit level that is 1 level higher than the bit level of the current bitplane block, the XOR operator 146 may perform XOR operation between the bitplane block to be currently coded and the upper level bitplane block (that is, the just previously coded bitplane block) for each pixel.

The bitplane encoding unit 148 encodes the current bitplane block using a predetermined encoding algorithm. Here, the current bitplane block means a bitplane block to be currently coded in a received depth map block, and may be a bitplane block subjected to XOR operation by the XOR operator 146 or a bitplane block received directly from the bitplane divider 144 without passing through the XOR operator 146. The bitplane encoding unit 148 may encode the current bitplane block using an encoding method which is selected depending on whether the corresponding current image is an intra picture or an inter picture, or may encode the current bitplane block using a predetermined encoding method regardless of the type of the current image. Hereinafter, the former case will be described.

When the current image is an intra picture, the current bitplane block is encoded according to the method described above with reference to FIG. 8. In more detail, referring to FIG. 10, the bitplane encoding unit 148 encodes the current bitplane block after distinguishing the case where pixel values of the current bitplane block are all "0(0)" or all "255(1)" from the case where some of the pixel values of the current bitplane block are "0(0)" and the remainder are "255(1)". For example, if the pixel values of the current bitplane block are all "0(0)" or all "255(1)", the bitplane encoding unit 148 may encode only bitplane block mode information. If some of the pixel values of the current bitplane block are "0(0)" and the remainder are "255(1)", the bitplane encoding unit 148 may encode the current bitplane block according to a predetermined encoding algorithm suitable for encoding binary images. The result of the encoding (that is, encoded data or bitplane block mode information) is output to the multiplexer 160.

Figure 14:
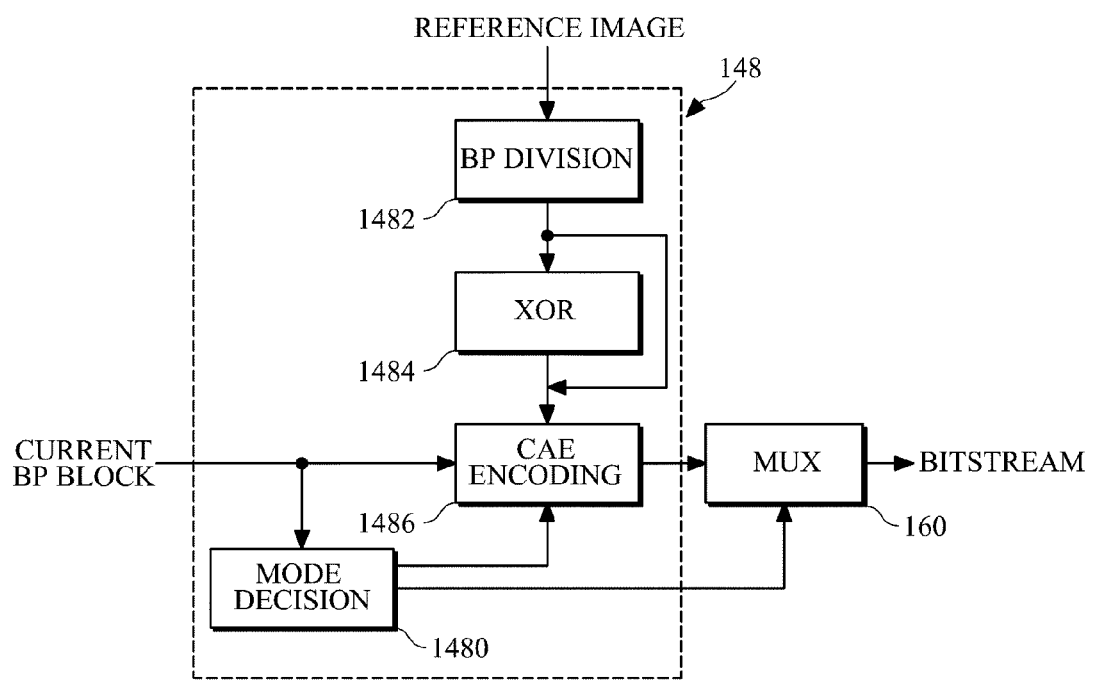
FIG. 14 is a diagram illustrating a configuration of an example bitplane encoding unit of the depth map encoder illustrated in FIG. 10.

FIG. 14 is a diagram illustrating an example configuration for intra-picture in the bitplane encoding unit 148 of the depth map encoder illustrated in FIG. 10. The bitplane encoding unit 148 may be an example apparatus to implement the encoding method described above with reference to FIG. 8. A method of encoding a bitplane block in an intra picture through the bitplane encoding unit 148 is based on binary shape coding defined in the MPEG-4 Part-2 Visual (ISO/IEC 14496-2), which will be described in detail later. However, the configuration of the bitplane encoding unit 148 or an encoding algorithm for an intra picture that is used by the bitplane encoding unit 148 are not limited to embodiments given herein.

Referring to FIG. 14, a mode deciding unit 1480 decides a mode of a received current bitplane block. For example, if pixel values of the current bitplane block are all "255(1)", a mode of the current bitplane block may be set to a predetermined block mode "all_1 mode" indicating that the pixel values of the current bitplane block are all "255(1)", and if the pixel values of the current bitplane block are all "0(0)", a mode of the current bitplane block may be set to an a predetermined block mode "all_0 mode" indicating that the pixel values of the current bitlane block are all "0(0)". In this case, only the block mode information for the current bitplane block is encoded and input to the multiplexer 160 and then included in a bitstream.

Meanwhile, if the pixel values of the current bitplane block are not the same value, block mode information of the current bitplane block may be set as a value indicating a predetermined "binary image compression method" which is suitable to encode the corresponding bitplane block. For example, in the case of coding a current bitplane block in which "0(0)" and "255(1)" are mixed using the CAE method, block mode information of the current bitplane block may be set as a value indicating an "intraCAE mode". In this case, the current bitplane block is encoded using the CAE method by an CAE encoding unit 1486 and the result of the CAE encoding (encoded data) is input to the multiplexer 160 along with the block mode information and then included in a bitstream.

The CAE encoding unit 1486 may perform encoding using the well-known CAE encoding method or may perform encoding by applying a CAE encoding method appropriately modified in consideration of the characteristics of bitplanes in depth map. A reference bitplane required for CAE encoding is created from a bitplane block of a reference image that is obtained adaptively through a bitplane divider 1482 or through the bitplane divider 1482 and an XOR operator 1484. Referring to FIG. 10, the reference image may be an image decoded by the DCT-based encoding unit A, before being transferred to the deblocking filter 122, or an image decoded by the bitplane coding unit B. The reference image is transferred to the bitplane divider 1482 and represented in units of bitplane blocks. A bitplane block for the same bit level as that of the current bitplane block is subjected to XOR operation adaptively depending on whether the current bitplane block has been subjected to XOR operation, and then the bitplane block is transferred to the CAE encoding unit 1486.

Figure 15:
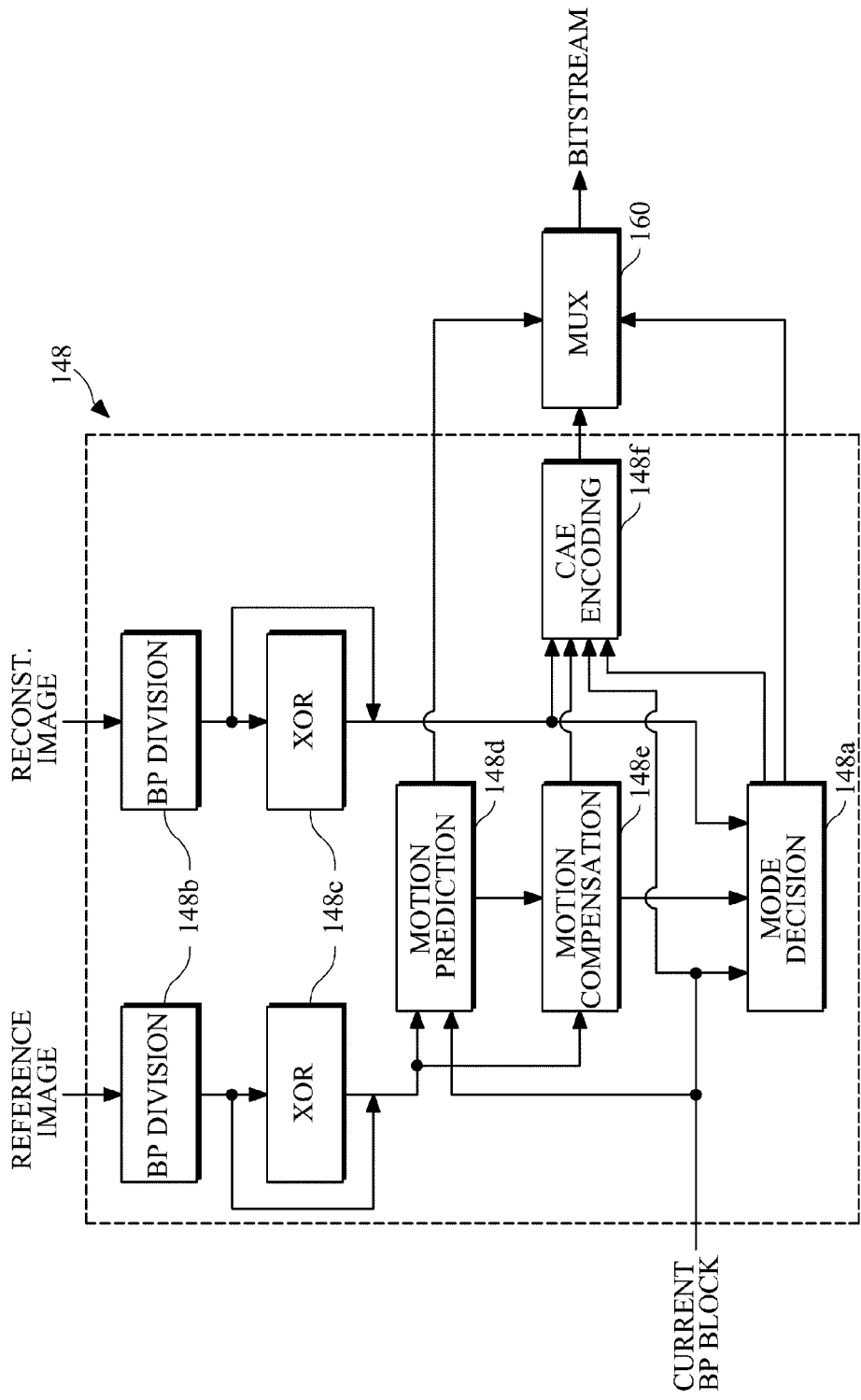
FIG. 15 is a diagram illustrating an example configuration for inter-picture in the bitplane encoding unit of the depth map encoder illustrated in FIG. 10.

FIG. 15 is a diagram illustrating an example configuration for inter-picture in the bitplane encoding unit 148. The bitplane encoding unit 148 may be an example apparatus to implement the encoding method described above with reference to FIG. 9. Also, a method of encoding a bitplane block in an inter picture through the bitplane encoding unit 148 is based on binary shape coding defined in MPEG-4 Part-2 Visual (ISO/IEC 14496-2), which will be described in detail below. However, the configuration of the bitplane encoding unit 148 or an encoding algorithm for inter picture that is used by the bitplane encoding unit 148 are not limited to embodiments given herein.

Referring to FIG. 15, a mode deciding unit 148*a* is used to decide a mode of a received current bitplane block. For example, as described above with reference to FIG. 9, a mode of a currently received bitplane block may be decided to be a "No Update Without MV" mode, an "all_1" mode, an "all_0" mode, a "No Update with MV" mode, an "intraCAE encoding" mode and/or an "interCAE encoding" mode, etc., using a bitplane block of a reconstructed image and/or a reference image obtained adaptively through a bitplane divider 148*b* or through the bitplane divider 148*b* and an XOR operator 148*c*.

If a mode of a current bitplane block is decided to be the "No Update with MV" mode, the block mode information (that is, the "No Update with MV" mode) and a motion vector MV are encoded and the result of the encoding is transferred to the multiplexer 160. In this case, the operation 26 of FIG. 9 is performed by a motion predictor 148*d*, and the operations 27 and 28 are performed by a motion compensator 148*e* and the mode deciding unit 148*a*.

Also, a mode of the current bitplane block is decided to be the "intraCAE encoding" mode or the "interCAE encoding" mode, the block mode information is encoded and the result of the encoding is transferred to the multiplexer 160, and also data of the current bitplane block is transferred to an CAE encoding unit 148*f*, encoded by the intraCAE or interCAE method and then transferred to the multiplexer 160. In this case, deciding the mode of the current bitplane block to be the "intraCAE encoding" mode or the "interCAE encoding" mode may be done by the mode deciding unit 148*a* or by the CAE encoding unit 148*f*. The CAE encoding unit 148*f* requires a reference bitplane to perform intra CAE encoding and/or inter CAE encoding, and the reference bitplane is generated from a bitplane block of a reconstructed image (or a reference image) obtained through the bitplane divider 148*b* and/or adaptively through the XOR operator 148*c*.

Figure 16:
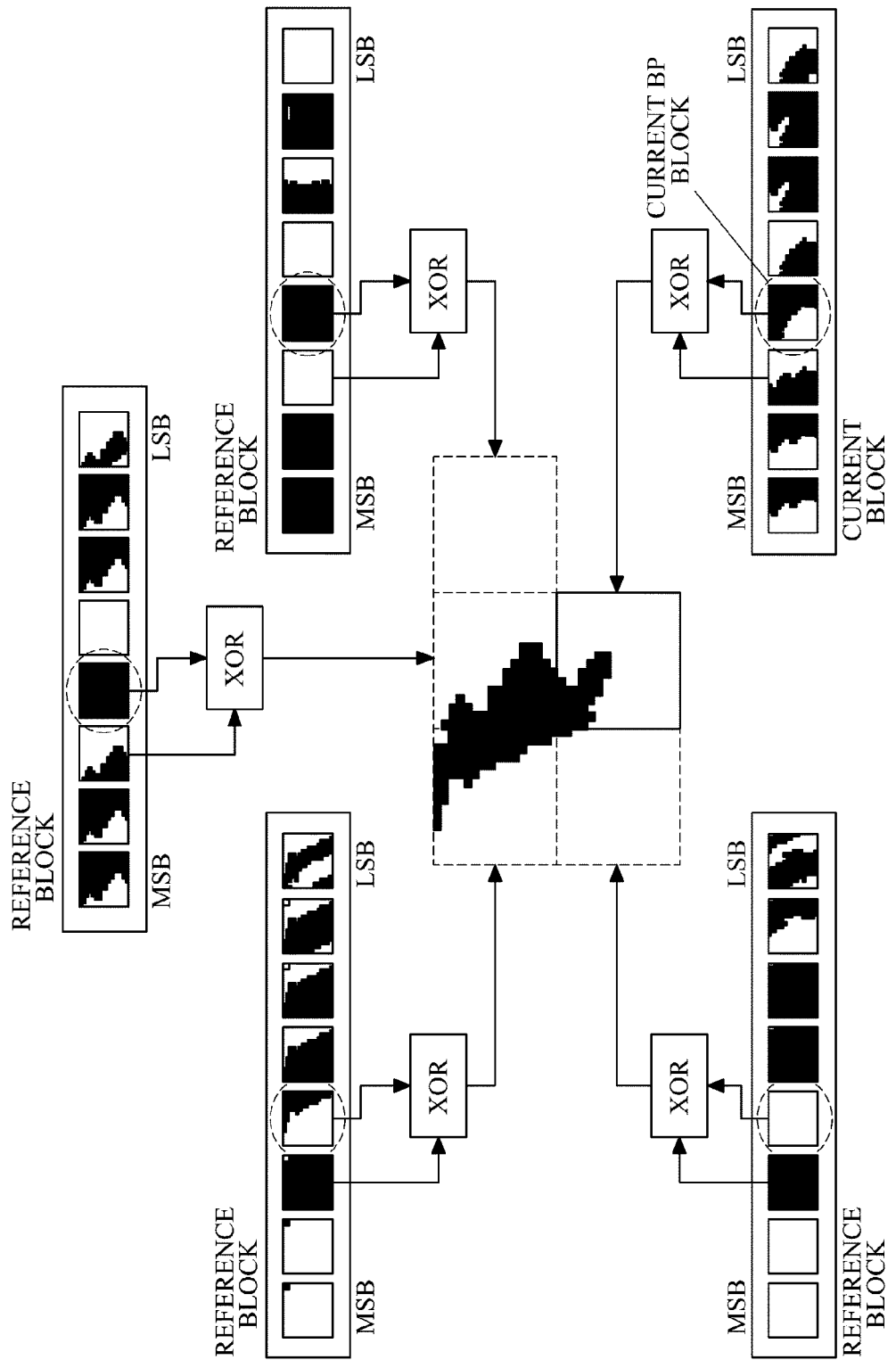
FIG. 16 is a view for explaining an example method in which a Context-based Arithmetic Encoding (CAE) encoding unit of the bitplane encoding unit illustrated in FIG. 14 or 15 constructs reference bitplanes.

FIG. 16 is a view for explaining an example method in which the CAE encoding unit 1486 of FIG. 14 or the CAE encoding unit 148*f* of FIG. 15 constructs a reference bitplane that is used for CAE encoding. In FIG. 16, a current bitplane block is a block surrounded by solid lines among 5 blocks illustrated in the center part. Referring to the lower right part of FIG. 16, it can be seen that the current bitplane block is a MSB-3 bitplane block subjected to XOR operation (146, see FIG. 10). However, it will be understood to those skilled in the art that even when the current bitplane block is a bitplane block for a different bit level, not subjected to XOR operation, a modification of the method illustrated in FIG. 16 can be applied to construct a reference bitplane.

As illustrated in FIGS. 14, 15 and 16, in order for the CAE encoding unit 1486 or 148*f* to perform CAE encoding on the MSB-3 bitplane block, reference bitplane blocks (four blocks surrounded by dotted lines among 5 blocks illustrated in FIG. 16) having the same bit level as that of the current bitplane block among blocks adjacent to the current block are needed. For obtaining the reference bitplane blocks, the bitplane divider 1482 or 148*b* divides each of blocks (that is, reference blocks) adjacent to the current block into units of bitplane blocks, thus generating reference bitplane blocks. Then, the XOR operator (1484 or 148*c*) performs XOR operation on the MSB-3 bitplane blocks of the reference bitplane blocks since the current MSB-3 bitplane block to be coded has been subjected to XOR operation. Then, the MSB-3 bitplane blocks of the reference bitplane blocks, subjected to XOR operation, are combined to form a reference bitplane.

Up to now, a method of encoding bitplane blocks using the CAE encoding algorithm in the bitplane encoding unit 148 has been described. However, the current embodiment is not limited to this, and the bitplane encoding unit 148 may encode bitplane blocks using any other encoding algorithm. For example, the bitplane encoding unit 148 may encode bitplanes or bitplane blocks using Run Length coding (RLC) or Variable Length Coding (VLC), using known Context-based Adaptive Binary Arithmetic Coding (CABAC) or using a Joint Bi-level Image Processing Group (JBIG) method or a Quad Tree method.

Returning again to FIG. 10, information and data output from the bitplane encoding unit 148 are output in the form of a bitstream via the multiplexer 160, and are also decoded in units of bitplane blocks in order to encode subsequent depth maps. For the decoding, the output of the bitplane encoding unit 148 is transferred to a bitplane decoding unit 150 and then passes through an XOR operator 152, a bitplane combining unit 154 and a depth map constructing unit 156, thus finally outputting a reconstructed depth map block. This process will be described in more detail, below.

The bitplane decoding unit 150 performs a process opposite to the above-described process performed by the bitplane encoding unit 148. In more detail, the bitplane decoding unit 150 reconstructs a bitplane block using encoded data and/or mode information that is output from the bitplane encoding unit 148. The reconstructed bitplane block may be a bitplane block subjected to or not subjected to XOR operation during the encoding process, and the bitplane block subjected to XOR operation is output to the XOR operator 152 and the bitplane block not subjected to XOR operation is output to the bitplane combining unit 154.

In order to generate the reconstructed bitplane block, the bitplane decoding unit 150 has a configuration corresponding to the bitplane encoding unit 148.

Figure 17:
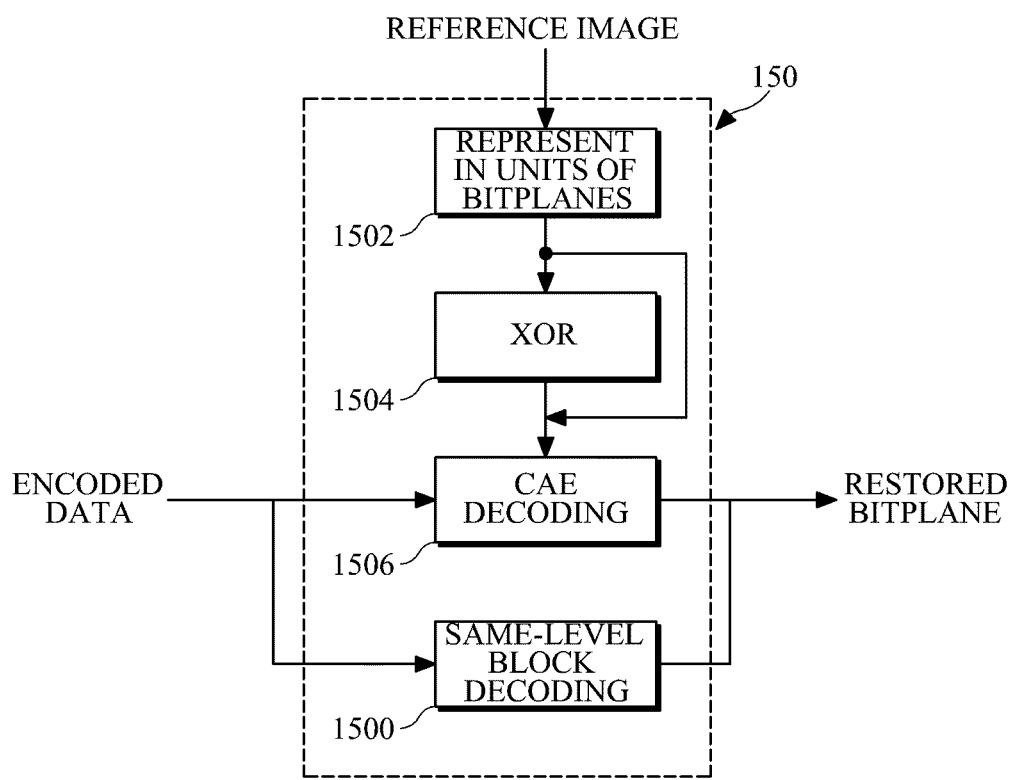
FIG. 17 is a diagram illustrating a configuration of an example bitplane decoding unit of the depth map encoder illustrated in FIG. 10.

For example, if the bitplane encoding unit 148 includes the configuration illustrated in FIG. 14, the bitplane decoding unit 150 may also have a configuration based on binary image decoding for intra picture, which is defined in the MPEG-4 Part-2 Visual (ISO/IEC 14496-2), as illustrated in FIG. 17. FIG. 17 is a diagram illustrating a configuration of an example bitplane decoding unit 150.

Referring to FIG. 17, if a mode of a bitplane block that is to be decoded is the "all_0 mode" or the "all_1 mode", a same-level block decoding unit 1500 generates a bitplane block in which all pixel values are "0(0)" or "255(1)". Meanwhile, if a mode of the bitplane block is the "intraCAE mode", a CAE decoding unit 1506 performs CAE decoding using a reference bitplane block, thus outputting a reconstructed bitplane block. The reference bitplane block may be generated through the same process as that described above with reference to FIG. 14. In more detail, a received reference image is represented in units of bitplane blocks by a bitplane divider 1502, and the bitplane blocks are constructed as a reference bitplane that is to be used for CAE decoding by a CAE decoding unit 1506 or constructed as a reference bitplane after being subjected to XOR operation by an XOR operator 1504. Here, a determination on which bitplane blocks have to pass through the XOR operator 1504 (that is, has to be subjected to XOR operation) may be done depending on whether the current bitplane block that is to be decoded has been subjected to XOR operation.

If the bitplane encoding unit 148 includes the configuration illustrated in FIG. 15, the bitplane decoding unit 150 may also have a configuration based on binary image decoding for inter picture, which is defined in MPEG-4 Part-2 Visual (ISO/IEC 14496-2). Details for a configuration of such a bitplane decoding unit will be described later with reference to FIG. 19.

Returning again to FIGS. 10 and 17, the XOR operator 152 performs XOR operation on the reconstructed bitplane blocks. In this case, the XOR operation is performed not on all reconstructed bitplane blocks but on bitplane blocks subjected to XOR operation. Whether or not a currently reconstructed bitplane block has been subjected to XOR operation (operation 146) is determined from XOR operation information, for example, from an XOR flag.

Then, the bitplane combining unit 154 restores n bits of a depth map block from the reconstructed bitplane blocks. The reconstructed bitplane blocks may be bitplane blocks output directly from the bitplane decoding unit 150 or bitplane blocks output via the bitplane unit 150 and the XOR operator 152 after being subjected to XOR operation by the XOR operator 152.

Successively, the depth map constructing unit 156 creates N bits of a depth map using the n bits of the restored depth map block. In order to construct N bits of a depth map, a bitplane block whose pixel values are all "0(0)" may be added to the n bits of the depth map block to be assigned as the (N−n) lower bits of the depth map. That is, by assigning a value "0" to the lower (N−n) bits of each pixel, N bits of a depth map may be restored. The depth map block restored by the depth map constructing unit 156 is transferred to the DCT-based encoding unit A and used as a reference image for intra prediction. Alternatively, the restored depth map block is transferred to the deblocking filter 122 and stored in the reconstructed image buffer of the image buffer 130 after deblocking filtering and/or is used to construct a reference bitplane in the bitplane encoding unit 148 and the bitplane decoding unit 150.

Figure 18:
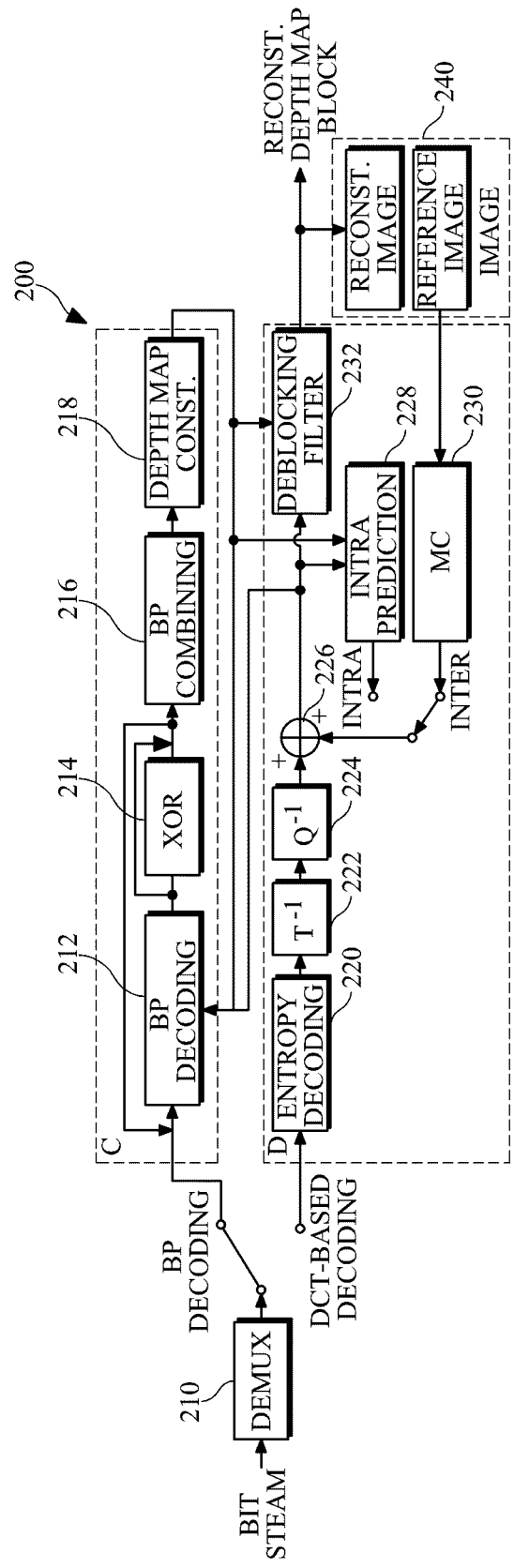
FIG. 18 is a diagram illustrating a configuration of an example depth map decoder.

FIG. 18 is a diagram illustrating a configuration of an example depth map decoder 200. The depth map decoder 200 is a component which operates in correspondence to the operation of the depth map encoder 100 described above with reference to FIG. 10. The configuration of the depth map decoder 200 may be modified in correspondence to the configuration of the depth map encoder 100. Like the depth map encoder 100, the depth map decoder 200 performs decoding in units of a predetermined size (M×N) of blocks, wherein M×N is not limited to a specific value. Hereinafter, the depth map decoder 200 and a decoding method thereof will be described in detail with reference to FIG. 18.

Referring to FIG. 18, the depth map decoder 200 includes a DCT-based decoding unit D and a bitplane decoding unit C. The bitplane decoding unit C operates in correspondence to the operation of the bitplane encoding unit B illustrated in FIG. 10. That is, the bitplane decoding unit C reconstructs a depth map in units of bitplane blocks using a bitstream received from a demultiplexer 210, adaptively performs XOR operation on the reconstructed bitplane blocks and then combines the reconstructed bitplane blocks adaptively subjected to or not subjected to XOR operation, thereby reconstructing a depth map block. Details for the configuration and operation of the bitplane decoding unit C will be described in more detail later.

Meanwhile, the DCT-based decoding unit D operates in correspondence to the operation of the DCT-based encoding unit A illustrated in FIG. 10. The DCT-based decoding unit D decodes a depth map in units of blocks using an existing decoding method to decode image information, and accordingly may have the same configuration as a H.264/AVC-based decoding unit. However, the current embodiment is not limited to this, and like the DCT-based encoding unit A, the DCT-based decoding unit D may be based on the MPEG-1, MPEG-2, MPEG-4 Part 2 Visual, VC (Video Coding)-1, MVC, SVC (Scalable Video Coding), any other existing coding scheme, or a new coding scheme that will be developed in the future.

Referring to FIG. 18, the depth map decoder 200 performs decoding through one of the bitplane decoding unit C and the DCT-based decoding unit D according to coding mode information, thereby outputting a reconstructed depth map block. The coding mode information is included in the bitstream. The demultiplexer 210 extracts coding mode information from the received bitstream, decodes the coding mode information, and then distributes the bitstream to the bitplane decoding unit C or to the DCT-based decoding unit D according to the coding mode information. For example, if the coding mode information indicates "bitplane coding", encoded data output from the demultiplexer 210 is decoded by the bitplane decoding unit C according to the following method.

First, a bitplane decoding unit 212 receives encoded data from the demultiplexer 210 and performs a predetermined decoding algorithm on the encoded data, thus restoring n bitplane blocks. Here, the n bitplane blocks are a part of N bitplane blocks which have been actually encoded during the encoding process in order to obtain a desired bit rate. The bitplane decoding unit 212 is configured to operate in correspondence to the operation of the bitplane encoding unit 148 (see FIG. 10).

Figure 19:
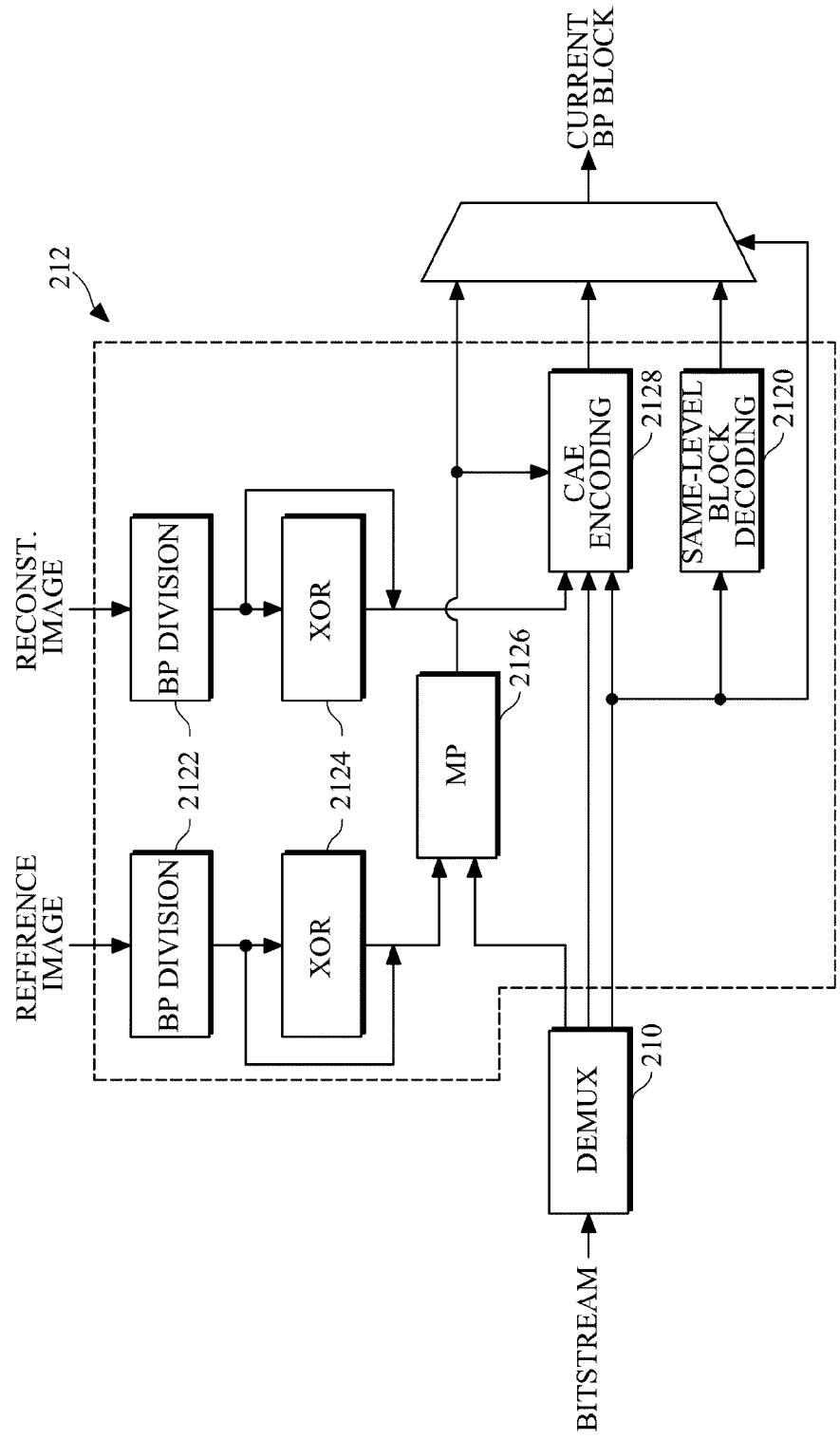
FIG. 19 is a diagram illustrating an example configuration for inter-picture in the bitplane decoding unit of the bitplane decoder illustrated in FIG. 18.

For example, the bitplane decoding unit 212 may include a decoding unit having the same configuration as the bitplane decoding unit 150 illustrated in FIG. 17. When the bitplane decoding unit 212 includes a decoding unit having the same configuration as the bitplane decoding unit 150, the bitplane decoding unit 212 may restore bitplane blocks of blocks belonging to an intra picture using the CAE decoding method for intra picture and/or a same-level block decoding method. Also, the bitplane decoding unit 212 may include a decoding unit to restore bitplane blocks of blocks belonging to an inter picture. FIG. 19 is a diagram illustrating an example configuration for inter-picture in the bitplane decoding unit 212.

Referring to FIG. 19, a received bitstream is demultiplexed by a demultiplexer 210, and the results of the demultiplexing, that is, mode information of a current bitplane block, a motion vector MV, a CAE-encoded bitstream, etc. are transferred to the bitplane decoding unit 212. The bitplane decoding unit 212 decodes the received data according to the mode information, thus restoring bitplane blocks.

If the mode information indicates the "No Update Without MV" mode, a motion compensator 2126 performs motion compensation using a predicted motion vector value MVp and outputs a motion-compensated bitplane block, that is, a reference bitplane block corresponding to the predicted motion vector value MVp as a restored bitplane block. The predicted motion vector value MVp may be calculated by various methods, for example, by the same method as that used when the bitplane encoding unit 148 (see FIG. 10) calculates a predicted value MVp of a motion vector.

If the mode information indicates the "all_0 mode" or the "all_1 mode", a same-level block decoding unit 2120 restores and outputs a bitplane block in which all pixel values are "0(0)" or "255(1)". If the mode information indicates the "No Update with MV" mode, the motion compensator 2126 performs motion compensation using a motion vector received from the demultiplexer 210 and outputs a motion-compensated bitplane block, that is, a reference bitplane block corresponding to the motion vector MV as a restored bitplane block. Also, if the mode information indicates the "intraCAE" mode or the "interCAE" mode, a CAE decoding unit 2128 performs Binary Arithmatic Coding (BAC), for example, intraCAE decoding or interCAE decoding to output a reconstructed bitplane block.

A method of generating a reference bitplane used to perform motion compensation or CAE decoding has been described above. In more detail, a received reference image (or a reconstructed image) is represented in units of bitplane blocks by a bitplane divider 2122. Also, bitplane blocks for the same bit level as that of the current bitplane block, among the bitplane blocks, are transferred to the motion compensator 2126 or CAE decoding unit 2128, after being subjected to XOR operation by an XOR operator 2124 or without being subjected to XOR operation, and then are used as reference bitplane blocks. Here, a determination on which bitplane blocks have to pass through the XOR operator 2124 (that is, has to be subjected to XOR operation) may be done depending on a value (for example, a value of an XOR flag) indicating whether or not the current bitplane block that is to be decoded has been subjected to XOR operation during the encoding process.

Referring again to FIG. 18, an XOR operator 214 adaptively performs XOR operation on each bitplane block restored by the bitplane decoding unit 212. For example, the XOR operator 214 may perform or may not perform XOR operation on the corresponding bitplane block according to decoded XOR operation information, for example, a value of an XOR flag. The XOR operator 214 may perform XOR operation using as a reference bitplane block a bitplane block for a bit level that is 1 level higher than that of the current bitplane block. However, a reference bitplane used for XOR operation may be decided using any appropriate method.

A bitplane combining unit 216 combines bitplane blocks output from the bitplane decoding unit 212 or via the bitplane decoding unit and the XOR operator 214, thus generating a depth map block in which each pixel is represented by n bits.

Then, a depth map constructing unit 218 forms N bits of a depth map block using the n bits of the depth map block. For example, the depth map constructing unit 218 adds (N−n) lower bits to each pixel of the n bits of the depth map block, that is, adds (N−n) bitplane blocks as bitplane blocks for the lower-level bits, thereby constructing N bits of a depth map block. In this case, the lower bits that are to be added may all have a predetermined value, for example, "0", that is, all pixel values of the (N−n) bitplane blocks that are to be added may be "0".

Alternatively, the depth map constructing unit 218 may use predetermined information included in a received bitstream, that is, information regarding the (N−n) bitplane blocks that are to be added. For example, the depth map constructing unit 218 may assign "0(0)" or "255(1)" to all pixel values of the (N−n) bitplane blocks to be added, according to the predetermined information, or may decide pixel values of the (N−n) bitplane blocks to be added using a padding method, etc, which uses another adjacent bitplane block.

Finally, the depth map block which is output from the depth map constructing unit 218 and represented by N bits may be used as a reference block for intra prediction by an intra predictor 228 of a DCT-based decoding unit D, and/or the depth map block may be used as a reference block for CAE decoding by the bitplane decoding unit 212 of the bitplane decoding unit C. The depth map block passes through a deblocking filter 232 and is then stored in a reconstructed image buffer of the image buffer 240 and/or is output as a reconstructed depth map block from the depth map decoder 200.

Referring to FIG. 18, if the coding mode information indicates "DCT-based coding", encoded data output from the demultiplexer 210 is decoded by the DCT-based decoding unit D according to the following method. First, the DCT-based decoding unit D generates a predicted block and adds the predicted block to a residual block obtained by decoding a received bitstream, thus generating a reconstructed depth map block. This process will be described in more detail below.

The predicted block is generated according to a prediction mode of a current block. For example, if a prediction mode of a current block is an intra prediction mode, an intra predictor 228 performs spatial prediction using already decoded peripheral pixel values of the current block, thus generating a predicted block. Meanwhile, if the prediction mode of the current block is an inter prediction mode, an inter predictor (for example, a motion compensator) 230 searches for a region most matching the current block from among reference images stored in the reference image buffer of the image buffer 240, using a motion vector, and performs motion compensation on the found region, thus generating a predicted block.

An entropy decoding unit 220 performs entropy decoding on a bitstream received from the demultiplexter 210 based on probability distributions, thus outputting a quantization coefficient.

Then, a dequantization unit 222 performs dequantization on the quantization coefficient to output a transformation coefficient. An inverse-transformer 224 performs inverse-transformation on the transformation coefficient, thereby generating a residual block. An adder 226 adds the residual block and the predicted block, thus outputting a reconstructed block. The reconstructed block is transferred as a reference block to the bitplane decoding unit C for bitplane decoding, and/or is stored in the reconstructed image buffer of the image buffer 240 after being subjected to deblocking filtering by a deblocking filter 232, and/or is output as a reconstructed depth map block.

In order to verify the effect of the block-based depth map coding method described above, a simulation on the block-based depth map coding method according to the current embodiment and the existing H.264/AVC-based encoding/decoding method using the Joint Model (JM) 13.2 has been performed under experimental conditions as follows.

| | |
|---|---|
| Resolution and Frame Rate | 1024 × 768, 15 Hz |
| Number of Frames | 100 Frames |
| Image Format | YUV 4:0:0 |
| Quantization Parameter | 22, 27, 32, 37 |
| Entropy Coding | CAVLC |

Figure 20:
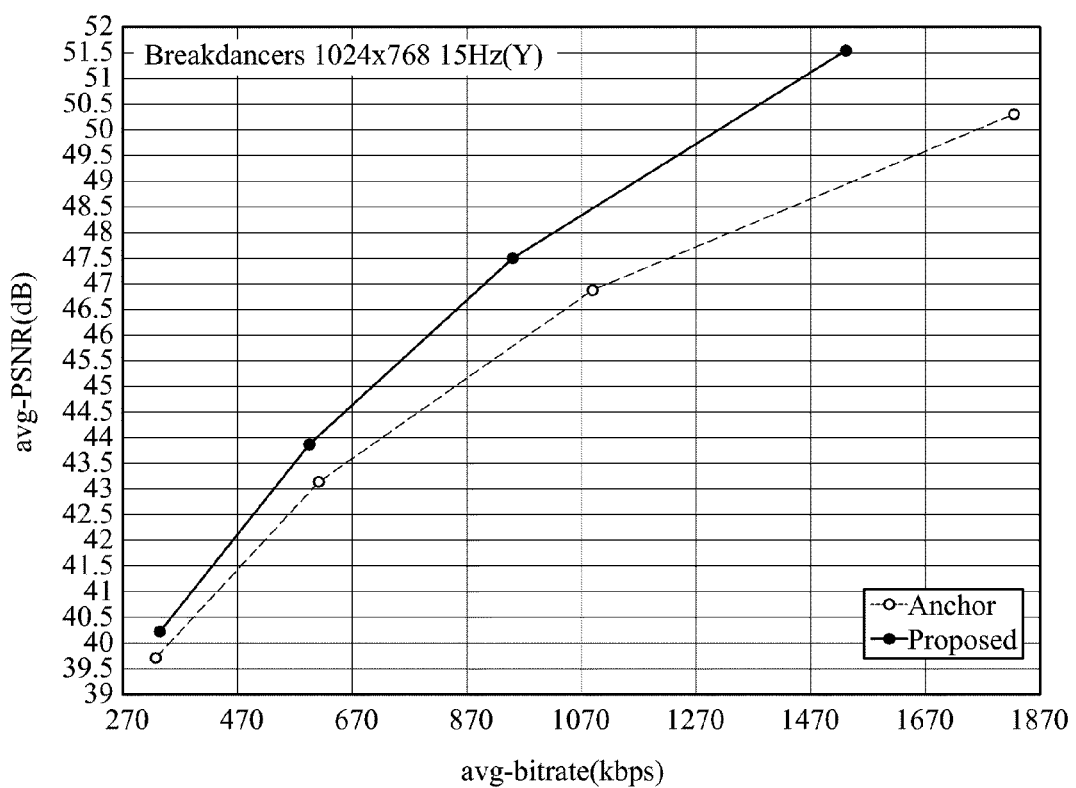
FIG. 20 shows an example of Rate-Distortion (RD) curves plotting Peak Signal-to-Noise Ratio (PSNR) with respect to bit rate, which are measured as experimental results in two cases of applying an existing H.264/AVC-based method (Anchor) and applying a currently proposed coding method (Proposed).
Figure 21:
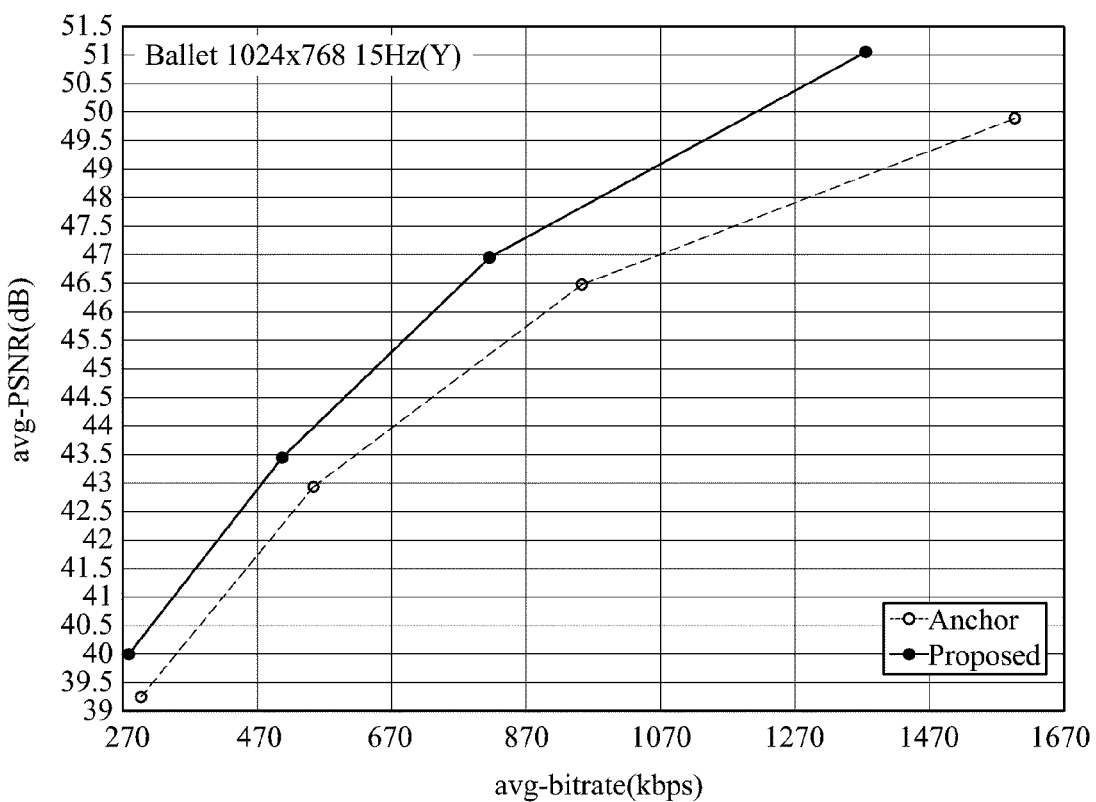
FIG. 21 shows other example RD curves plotting PSNR with respect to bit rate, which are measured as experimental results in two cases of applying the existing H.264/AVC-based method (Anchor) and applying the currently proposed coding method (Proposed).

FIGS. 20 and 21 show examples of Rate-Distortion (RD) curves plotting Peak Signal-to-Noise Ratio (PSNR) with respect to bit rate, which are measured as experimental results in two cases of applying the existing H.264/AVC-based method (Anchor) and applying the currently proposed coding method (Proposed), wherein FIG. 20 relates to an image sequence "Breakdancers" that is one of test image sequences, and FIG. 21 relates to an image sequence "Ballet" that is one of test images sequences. It is verified from FIGS. 20 and 21 that the currently proposed coding method shows significantly higher performance than the existing H.264/AVC-based method (Anchor) does. In more detail, in the depth map of the "Breakerdancers" image sequence, the currently proposed method shows BD-PSNR which is about 1.2 dB higher than the existing method, and shows a BD-rate which is about 16.8% lower than the existing method. Also, in the depth map of the "Ballet" image sequence, the currently proposed method shows BD-PSNR which is about 1.3 dB higher than the existing method, and shows a BD-rate which is about 18.7% lower than the existing method.

FIG. 22 illustrates an original depth map image (a) corresponding to a part of the "Breakdancers" image, a depth map image (b) obtained by encoding and decoding the original depth map image using the existing H.264/AVC-based method, and a depth map image (c) obtained by encoding and decoding the original depth map image using the currently proposed coding method. It can be seen from FIG. 22 that the image (b) decoded using the existing method has a deteriorated picture quality, particularly, near the boundaries of objects. Meanwhile, it can be seen from FIG. 22 that the currently proposed method improves picture quality, in particular the picture quality near the boundaries of objects compared to the existing method.

A number of example embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method for decoding a depth map, the method comprising:
    performing bitplane decoding on a bitstream in units of blocks of a predetermined size to reconstruct the depth map;
    decoding coding mode information for each depth map block, the coding mode information being contained in the bitstream; and
    decoding XOR operation information for each bitplane block contained in the bitstream,
    wherein the bitplane decoding is performed in response to the decoded coding mode information indicating bitplane decoding,
    wherein the bitplane decoding comprises adaptively performing XOR operation in units of bitplane blocks; and
    the XOR operation is performed on a bitplane block only in response to the decoded XOR operation information indicating that an XOR operation has to be performed.

2. The method of claim 1, further comprising reconstructing the depth map by combining bitplane blocks subjected to XOR operation and/or bitplane blocks not subjected to XOR operation.

3. A method for decoding a depth map, the method comprising:
    decoding XOR operation information for each bitplane block contained in the bitstream; and
    performing XOR operation information using a restored bitplane block and a reference bitplane block;
    restoring coding mode information for each depth map block, the coding mode information contained in the bitstream, the method being performed when the decoding mode information indicates bitplane coding
    wherein the XOR operation on the restored bitplane block and the reference bitplane block is performed on a bitplane block only in response to the decoded XOR operation information indicating that XOR operation has to be performed, and
    wherein the performing of the SOR operation using the bitplane block and the reference bitplane block comprises:
    decoding a bitstream in units of bitplane to restore a bitplane block;
    adaptively performing XOR operation on the restored bitplane block; and
    combining bitplane blocks subjected to XOR operation and/or bitplane blocks not subjected to XOR operation.

4. The method of claim 3, further comprising:
    restoring block mode information contained in the bitstream,
    wherein, in the decoding of the bitstream, the bitplane block is restored according to a method indicated by the block mode information.

5. The method of claim 4, wherein, if an image to be decoded is an intra picture, the block mode information indicates one mode among an "all_0 mode," an "all_1 mode," and a "binary image compression mode."

6. The method of claim 4, wherein, in response to the block mode information indicating the "all_0 mode" or the "all_1 mode," pixel values of the restored bitplane block are all "0" or "1," respectively.

7. The method of claim 4, wherein, if the block mode information indicates the "binary image compression mode," the bitplane block is restored according to a decoding method regarding the binary image compression mode.

8. The method of claim 7, wherein the binary image compression mode refers to a Context-based Arithmetic Encoding (CAE) method.

9. The method of claim 7, wherein the binary image compression mode refers to one selected from a group including a combination of Run Length coding (RLC) and Variable Length Coding (VLC), Context-based Adaptive Binary Arithmatic Coding (CABAC), a Joint Bi-level Image Processing Group (JBIG) method, and a Quad Tree method.

10. The method of claim 4, wherein, if an image to be decoded is an inter picture, the block mode information indicates one mode among a "No Update Without MV mode", an "all_0 mode," an "all_1 mode," a "No Update with MV mode," and a "binary image compression mode."

11. The method of claim 10, wherein, if the block mode information indicates the "No Update Without MV mode" or the "No Update with MV mode," in the decoding of the bitstream, the bitplane block is restored through motion prediction using an predicted value of a motion vector or a decoded motion vector.

12. The method of claim 3, wherein the reference bitplane block is a restored bitplane block for a bit level that is 1 level higher than that of the bitplane block or for a specific level of bit selected from among other bitplanes except the bitplane block.

13. The method of claim 3, wherein, in the combining of the bitplane blocks, if n ($\leq$N) bitplane blocks are combined, further comprising adding (N−n) bits as lower-level bits to each pixel value of the combined bitplane block of the n bitplane blocks, thereby reconstructing the depth map block that is represented by N bits.

14. A depth map decoding method, comprising:
    decoding coding mode information for each depth map block, the coding mode information contained in a bitstream; and
    performing bitplane decoding or Discrete Cosine Transform (DCT)-based decoding on the bitstream in units of blocks according to the decoded coding mode information to restore bitplane blocks,
    wherein the performing of bitplane decoding comprises:
        decoding the bitstream in units of bitplane to restore a bitplane block;
        decoding XOR operation information for each bitplane block contained in the bitstream;
        adaptively performing XOR operation on the restored bitplane block; and
        combining bitplane blocks subjected to XOR operation and/or bitplane blocks not subjected to XOR operation, and
    wherein the XOR operation is performed on a bitplane block only in response to the decoded XOR operation information indicating that XOR operation has to be performed.

15. The depth map decoding method of claim 14, wherein the DCT-based decoding is one decoding method among MPEG-1, MPEG-2, MPEG-4 Part 2 Visual, H.264/AVC (Advanced Video Coding), and VC (Video Coding)-1.

16. The depth map decoding method of claim 14, wherein the coding mode information indicates one selected between the bitplane coding and the DCT-based coding through evaluation in coding efficiency based on a predetermined algorithm when the depth map is encoded in units of blocks.

17. The depth map decoding method of claim 16, wherein the predetermined algorithm is a Rate-Distortion (RD) optimization technique.

18. A method for decoding a depth map block each pixel of which is represented by N bits, the method comprising:
    performing decoding according to block mode information for each bitplane block to restore n ($\leq$N) bitplane blocks;
    adaptively performing XOR operation on each of the n bitplane blocks using a reference bitplane block according to XOR operation information for each of the bitplane blocks; and
    combining the n bitplane blocks subjected to and not subjected to the XOR operation,
    wherein if n is less than N, the method further comprises adding (N−n) bits as lower-level bits to each pixel value of the combined bitplane block of the n bitplane blocks, thereby reconstructing the depth map block that is represented by N bits, and
    wherein the XOR operation is performed on a bitplane block only in response to the decoded XOR operation information indicating that XOR operation has to be performed.

19. The depth map decoding method of claim 18, wherein the block mode information indicates one mode among an "all_0 mode," an "all_1 mode," and a "binary image compression mode."

20. The depth map decoding method of claim 18, wherein the block mode information indicates one mode among a "No Update Without MV mode," an "all_0 mode," an "all_1 mode," a "No Update with MV mode," and a "binary image compression mode."

21. The depth map decoding method of claim 20, wherein the binary image compression mode refers to a Context-based Arithmetic Encoding (CAE) method.

22. The depth map decoding method of claim 21, wherein a reference bitplane block required to perform the CAE method is generated using bitplane blocks that are obtained by adaptively performing XOR operation on bitplane blocks for a bit level having the same bit level as that of a current bitplane block, among M bitplane blocks generated by dividing each of reference depth map blocks adjacent to the current depth map block.

23. The depth map decoding method of claim 22, wherein, in the generating of the reference bitplane block, the XOR operation is performed when XOR operation information of the current bitplane block indicates that the current bitplane block has been subjected to XOR operation.

24. The depth map decoding method of claim 22, wherein each reference depth map block is a depth map block reconstructed in the reconstructing of the depth map block or a depth map block reconstructed using Discrete Cosine Transform (DCT)-based decoding.

25. The depth map decoding method of claim 18, wherein the decoding is performed by a binary image compression mode that is one selected from a group including a combination of Run Length coding (RLC) and Variable Length Coding (VLC), Context-based Adaptive Binary Arithmatic Coding (CABAC), a Joint Bi-level Image Processing Group (JBIG) method, and a Quad Tree method.

26. The depth map decoding method of claim 18, wherein the reference bitplane block is a reconstructed bitplane block for a bit level that is 1 level higher than that of the bitplane block or for a specific level of bit selected from among other bitplanes except the bitplane block.

* * * * *